(12) United States Patent
Yeo et al.

(10) Patent No.: US 12,303,775 B2
(45) Date of Patent: May 20, 2025

(54) EXTENDABLE CONTROLLER

(71) Applicant: Razer (Asia-Pacific) Pte. Ltd., Singapore (SG)

(72) Inventors: Melvin Yeo, Singapore (SG); Gil Jr Palma Guerrero, Singapore (SG)

(73) Assignee: Razer (Asia-Pacific) Pte. Ltd., Singapore (SG)

( * ) Notice: Subject to any disclaimer, the term of this patent is extended or adjusted under 35 U.S.C. 154(b) by 0 days.

(21) Appl. No.: 18/842,242

(22) PCT Filed: Mar. 10, 2023

(86) PCT No.: PCT/SG2023/050153
§ 371 (c)(1),
(2) Date: Aug. 28, 2024

(87) PCT Pub. No.: WO2023/172202
PCT Pub. Date: Sep. 14, 2023

(65) Prior Publication Data
US 2025/0099848 A1   Mar. 27, 2025

(30) Foreign Application Priority Data

Mar. 11, 2022   (WO) ................ PCT/SG2022/050126

(51) Int. Cl.
*A63F 13/24*   (2014.01)
*A63F 13/92*   (2014.01)
*A63F 13/98*   (2014.01)

(52) U.S. Cl.
CPC .............. *A63F 13/24* (2014.09); *A63F 13/92* (2014.09); *A63F 13/98* (2014.09)

(58) Field of Classification Search
CPC ........... A63F 13/24; A63F 13/92; A63F 13/98
See application file for complete search history.

(56) References Cited

U.S. PATENT DOCUMENTS

| 7,833,097 B1 | 11/2010 | Maddox et al. |
| 8,529,357 B2 | 9/2013 | Joynes et al. |
| (Continued) | | |

FOREIGN PATENT DOCUMENTS

| CN | 204380232 U | 6/2015 |
| CN | 105101702 A | 11/2015 |
| (Continued) | | |

OTHER PUBLICATIONS

International Search report; dated Mar. 10, 2023; Application #PCT/SG2023/050153.

(Continued)

*Primary Examiner* — Yingchuan Zhang
(74) *Attorney, Agent, or Firm* — Polsinelli PC

(57) ABSTRACT

An extendable controller including a handle part; an elongate bridge retractably extendable with respect to the handle part; and a link member disposed therebetween. An end portion of the elongate bridge is in sliding engagement with the link member so as to be retractably extendable relative to the link member. The link member is movable relative to the handle part between a retracted position and an extended position. The extendable controller further including a movement control arrangement operatively connected between the link member and the handle part to restrain the link member from moving between the retracted position and the extended position when the link member is in the retracted position and in the extended position respectively, wherein the movement control arrangement includes an input interface operable to release the link member from being restrained such that the link member is movable between the retracted position and the extended position.

20 Claims, 9 Drawing Sheets

(56) References Cited

U.S. PATENT DOCUMENTS

| | | | |
|---|---|---|---|
| 8,788,348 B2 | 7/2014 | Joynes et al. | |
| 8,812,987 B2 * | 8/2014 | Joynes | A63F 13/426 715/849 |
| 8,944,912 B2 | 2/2015 | Joynes et al. | |
| 8,944,913 B2 | 2/2015 | Joynes et al. | |
| 9,005,025 B2 | 4/2015 | Joynes et al. | |
| 9,005,026 B2 | 4/2015 | Joynes et al. | |
| 9,114,319 B2 | 8/2015 | Joynes et al. | |
| 9,126,119 B2 | 9/2015 | Joynes et al. | |
| 9,407,100 B2 | 8/2016 | Joynes et al. | |
| 9,592,452 B2 | 3/2017 | Townley et al. | |
| 9,592,453 B2 | 3/2017 | Townley et al. | |
| 9,757,649 B2 | 9/2017 | Townley et al. | |
| 9,764,231 B2 | 9/2017 | Townley et al. | |
| 9,808,713 B1 | 11/2017 | Townley et al. | |
| 9,839,842 B2 | 12/2017 | Townley et al. | |
| 9,841,786 B2 | 12/2017 | Townley et al. | |
| 9,841,824 B2 | 12/2017 | Townley et al. | |
| 9,855,498 B2 | 1/2018 | Townley et al. | |
| 10,092,830 B2 | 10/2018 | Townley et al. | |
| 10,159,895 B2 | 12/2018 | Townley et al. | |
| 10,391,393 B2 | 8/2019 | Townley et al. | |
| 10,868,436 B1 | 12/2020 | Chen et al. | |
| 11,389,721 B2 | 7/2022 | Khaira et al. | |
| 2008/0311963 A1 | 12/2008 | Strawn | |
| 2015/0031452 A1 | 1/2015 | Rundell et al. | |
| 2015/0092346 A1 | 4/2015 | Ben et al. | |
| 2016/0161989 A1 | 6/2016 | Prejer et al. | |
| 2017/0128830 A1 | 5/2017 | Fujita et al. | |
| 2017/0182410 A1 | 6/2017 | Townley et al. | |
| 2020/0398170 A1 | 12/2020 | McDole et al. | |
| 2021/0275907 A1 | 9/2021 | Khaira et al. | |
| 2021/0370164 A1 | 12/2021 | Lu et al. | |
| 2022/0032178 A1 | 2/2022 | Khaira et al. | |
| 2022/0032179 A1 | 2/2022 | Khaira et al. | |

FOREIGN PATENT DOCUMENTS

| | | |
|---|---|---|
| CN | 204973067 U | 1/2016 |
| CN | 206411846 U | 8/2017 |
| CN | 105101702 B | 6/2018 |
| CN | 207667130 U | 7/2018 |
| CN | 207838250 U | 9/2018 |
| CN | 208990202 U | 6/2019 |
| CN | 110478894 A | 11/2019 |
| CN | 209731394 U | 12/2019 |
| CN | 211561819 U | 9/2020 |
| CN | 211912693 U | 11/2020 |
| CN | 212141443 A | 12/2020 |
| CN | 212141443 U | 12/2020 |
| CN | 212677220 U | 3/2021 |
| CN | 112973111 A | 6/2021 |
| CN | 213313306 U | 6/2021 |
| CN | 216046252 U | 3/2022 |
| KR | 20110081018 A | 7/2011 |
| KR | 10-2017-0068204 A | 6/2017 |
| WO | 2004/007041 A2 | 1/2004 |

OTHER PUBLICATIONS

Bluetooth Game Controller Wireless Gamepad Telescopic Gamepad Joystick for Mobile Phone Android Game Handle for IOS Android; https://www.sociableweavernest.com/products/bluetooth-game-controller-wireless-gamepad-telescopic-gamepad-joystick-for-mobile-phone-android; Aug. 2, 2023.

ElementDigital Mobile Game Controller—Telescopic Wireless Bluetooth Controller Gamepad for Android Phone with Flexible Joystick Red+Blue; https://www.amazon.com/ElementDigital-Controller-Telescopic-Wireless-Bluetooth/dp/B07H3W4XZR; Aug. 2, 2023.

Cameron Faulker; Razer's Kishi turns your phone into a NintendoSwitch that can play Google Stadia; Jun. 9, 2020; https://www.theverge.com/21285073/razer-kishi-review-game-controller-phone-price-nintendo-switch-stadia.

* cited by examiner

EXTENDABLE CONTROLLER

TECHNICAL FIELD

Embodiments generally relate to an extendable controller, and particularly a symmetrically extendable controller.

BACKGROUND

In the market, game controllers for mobile phones typically include a clamping mechanism for attaching the mobile phone to the respective game controller. Generally, the clamping mechanism uses a single stack slider such that the left controller is being pulled away from the right controller, or vice versa, resulting in asymmetric configuration of the extended single stack slider when the left controller and the right controller are pulled away. Such asymmetric configuration may result in unequal backing support for the mobile phone. Such game controller may also result in wobbly and unstable clamped mobile phone experience for the user, which may cause irritation to the user. Further, such game controller may also not be aesthetically pleasing when in use.

Further, the user may also have tablets which they would like to interchange with the mobile phones so as to be used together with the game controllers. However, the tablets are generally larger than the mobile phones.

Accordingly, there is a need for a controller that addresses at least some of the issues identified above.

SUMMARY

According to various embodiments, there may be provided an extendable controller including a handle part; an elongate bridge retractably extendable with respect to the handle part along a longitudinal axis of the elongate bridge; and a link member disposed between the handle part and the elongate bridge. An end portion of the elongate bridge is in sliding engagement with the link member so as to be retractably extendable relative to the link member along the longitudinal axis of the elongate bridge. The link member is movable relative to the handle part between a retracted position and an extended position along an extension axis parallel to or coincident with the longitudinal axis of the elongate bridge. The extendable controller further including a movement control arrangement operatively connected between the link member and the handle part to restrain the link member from moving between the retracted position and the extended position relative to the handle part when the link member is in the retracted position and in the extended position respectively, wherein the movement control arrangement includes an input interface operable to release the link member from being restrained, when the link member is in the retracted position and in the extended position respectively, such that the link member is movable between the retracted position and the extended position relative to the handle part.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DETAILED DESCRIPTION

Figure 1A:
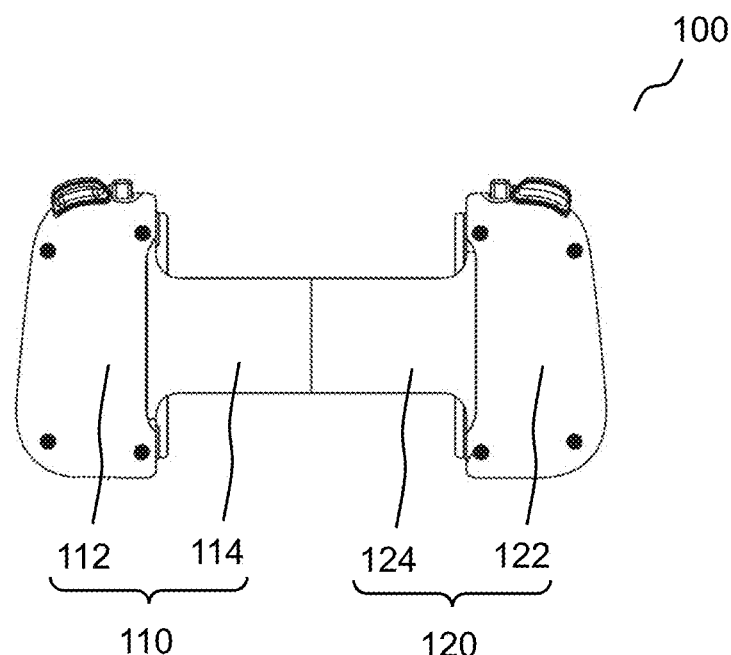
FIG. 1A shows a back view of an extendable controller in a retracted state according to various embodiments.

Embodiments described below in context of the apparatus are analogously valid for the respective methods, and vice versa. Furthermore, it will be understood that the embodiments described below may be combined, for example, a part of one embodiment may be combined with a part of another embodiment.

It should be understood that the terms "on", "over", "top", "bottom", "down", "side", "back", "left", "right", "front", "lateral", "side", "up", "down" etc., when used in the following description are used for convenience and to aid understanding of relative positions or directions, and not intended to limit the orientation of any device, or structure or any part of any device or structure. In addition, the singular terms "a", "an", and "the" include plural references unless context clearly indicates otherwise. Similarly, the word "or" is intended to include "and" unless the context clearly indicates otherwise.

Various embodiments relate to an extendable controller. In particular, various embodiments relate to a symmetrically or an asymmetrically extendable controller. According to various embodiments, the controller may be a game controller for a portable electronic device. According to various embodiments, the portable electronic device may include a smartphone, a mobile phones, a tablet, or any suitable handheld, lightweight electronic devices. According to various embodiments, the extendable controller may be configured to be extended or pulled apart so as to receive or retain or hold the portable electronic devices therebetween such that the portable electronic devices may be removably attached or secured or coupled to the extendable controller. According to various embodiments, the extendable controller may be extended or pulled apart in a symmetrical manner such that a middle portion of the extendable controller may remain in the middle regardless of whether the extendable controller is in the retracted state, or is undergoing extension, or is in the extended state. Accordingly, two opposite side portions of the extendable controller on opposite sides of the middle portion of the extendable controller may be extended (or pulled apart) and retracted in a synchronous (or simultaneous) and uniform (or symmetric) manner relative to the middle portion such that the middle portion may remain in the middle at all times. According to various embodiments, the extendable controller may be capable of a two-step extension. For example, by using a first step extension, the extendable controller may be used for smaller sized portable electronic device such as mobile phones or smart phones. By using a first extension and a second extension, the extendable controller may be used for bigger sized portable electronic device such as tablets. According to various other embodiments, the extendable controller may also be extended or pulled apart in an asymmetrical manner.

The following examples pertain to various embodiments.

Example 1 is an extendable controller including:
 a first handle part having a first bridge-link-portion extending from a first handle-body-portion;
 a second handle part having a second bridge-link-portion extending from a second handle-body-portion;
 an elongate bridge with a first half of the elongate bridge in sliding engagement with the first bridge-link portion of the first handle part along a longitudinal axis of the elongate bridge and a second half of the elongate bridge in sliding engagement with the second bridge-link portion of the second handle part along the longitudinal axis of the elongate bridge; and
 an extendable arrangement interconnecting the elongate bridge, the first handle part and the second handle part in a manner so as to synchronously extend and retract the first handle part and the second handle part uniformly in opposite directions relative to the elongate bridge along an extension axis, the extension axis being parallel to or coincide with the longitudinal axis of the elongate bridge,
 wherein the extendable arrangement includes
  a dual-reciprocating-opposite-motion-carrier system within the elongate bridge, the dual-reciprocating-opposite-motion carrier system including
   a first reciprocating carrier movable relative to the elongate bridge along a first carrier-path and within the elongate bridge,
   a second reciprocating carrier movable relative to the elongate bridge along a second carrier-path and within the elongate bridge, and
   an opposite motion mechanism interconnecting the first reciprocating carrier and the second reciprocating carrier, the opposite motion mechanism being configured to move the first reciprocating carrier and the second reciprocating carrier in opposite directions with respect to the extension axis of the extendable arrangement,
  a first elongate member with a first end portion coupled to the first handle part and a second end portion coupled to the first reciprocating carrier of the dual-reciprocating-opposite-motion-carrier system, and
  a second elongate member with a first end portion coupled to the second handle part and a second end portion coupled to the second reciprocating carrier of the dual-reciprocating-opposite-motion-carrier system.

In Example 2, the subject matter of Example 1 may optionally include that the first carrier-path and the second carrier-path may be parallel to the extension axis and on opposite sides of the extension axis.

In Example 3, the subject matter of Example 2 may optionally include that the first carrier-path and the second carrier-path may be equal in length and aligned to each other.

In Example 4, the subject matter of any one of Examples 1 to 3 may optionally include that the opposite motion mechanism may include
 a first pulley rotatably coupled to a first end portion of the elongate bridge in a manner so as to be rotatable about a first rotational axis perpendicular to the extension axis,
 a second pulley rotatably coupled to a second end portion of the elongate bridge in a manner so as to be rotatable about a second rotational axis perpendicular to the extension axis, the second rotational axis being parallel to the first rotational axis, and
 a continuous endless belt looped over the first pulley and the second pulley,
 wherein the first reciprocating carrier is at a first segment of the continuous endless belt and the second reciprocating carrier is at a second segment of the continuous endless belt, the first segment of the continuous endless belt and the second segment of the continuous endless belt being on opposite sides of the opposite motion mechanism across the extension axis.

In Example 5, the subject matter of Example 4 may optionally include that the first elongate member may be parallel to the extension axis, and the second elongate member is parallel to the extension axis.

In Example 6, the subject matter of Example 5 may optionally include
 a first guide pin disposed at the first end portion of the elongate bridge, and
 a second guide pin disposed at the second end portion of the elongate bridge,
 wherein the first elongate member may include an elongate slot extending longitudinally along a length of the first elongate member, and the first guide pin may be fitted through the elongate slot of the first elongate member to guide a longitudinal movement of the first elongate member, wherein the second elongate member may include an elongate slot extending longitudinally along a length of the second elongate member, and the second guide pin may be fitted through the elongate slot of the second elongate member to guide a longitudinal movement of the second elongate member.

In Example 7, the subject matter of any one of Examples 4 to 6 may optionally include that the continuous endless belt may be a toothed belt, and wherein each of the first pulley and the second pulley may be a toothed pulley.

In Example 8, the subject matter of any one of Examples 4 to 7 may optionally include that the continuous endless belt may be made of thermoplastic polyurethane (TPU), polyurethane (PU), or styrene-ethylene-butylene-styrene (SEBS).

In Example 9, the subject matter of any one of Examples 1 to 8 may optionally include that the first reciprocating carrier may include an interlocking arrangement and the second end portion of the first elongate member may include a complementary interlocking arrangement, wherein the interlocking arrangement of the first reciprocating carrier and the complementary interlocking arrangement of the first elongate member may be interlocked with each other so as to couple the second end portion of the first elongate member to the first reciprocating carrier, and the second reciprocating carrier may include an interlocking arrangement and the second end portion of the second elongate member may include a complementary interlocking arrangement, wherein the interlocking arrangement of the second reciprocating carrier and the complementary interlocking arrangement of the second elongate member may be interlocked with each other so as to couple the second end portion of the second elongate member to the second segment of the continuous endless belt.

In Example 10, the subject matter of Example 9 may optionally include that the interlocking arrangement of the first reciprocating carrier may be a protrusion and the complementary interlocking arrangement of the first elongate member may be a notch, and the interlocking arrangement of the second reciprocating carrier may be a protrusion and the complementary interlocking arrangement of the second elongate member may be a notch.

In Example 11, the subject matter of any one of Examples 1 to 10 may optionally include that the extendable arrangement may further include a first biasing element connected between the first handle part and the first end portion of the elongate bridge, the first biasing element being configured to bias against extending the first handle part from the elongate bridge along the extension axis, and a second biasing element connected between the second handle part and the second end portion of the elongate bridge, the second biasing element being configured to bias against extending the second handle part from the elongate bridge along the extension axis.

In Example 12, the subject matter of Example 11 may optionally include that each of the first biasing element and the second biasing element may be a tension spring or extension spring.

In Example 13, the subject matter of Example 11 or 12 may optionally include that the first biasing element and the first reciprocating carrier may be on opposite sides of the opposite motion mechanism with respect to the extension axis, and the second biasing element and the second reciprocating carrier may be on opposite sides of the opposite motion mechanism with respect to the extension axis.

In Example 14, the subject matter of any one of Examples 1 to 13 may optionally include that the first bridge-link-portion may be of a sleeve-like structure fitted over the first half of the elongate bridge, and the second bridge-like-portion may be of a sleeve-like structure fitted over the second half of the elongate bridge.

In Example 15, the subject matter of any one of Examples 1 to 14 may optionally include an electrical cable extending between the first handle part and the second handle part.

In Example 16, the subject matter of Example 15 may optionally include that the electrical cable may extend along the first bridge-link-portion, the elongate bridge and the second bridge-link portion.

In Example 17, the subject matter of Example 15 or 16 may optionally include that the electrical cable may include a flexible flat cable, a flexible cable, a ribbon cable, a coaxial cable, or a wire.

Example 18 is an extendable controller including:
a first handle part having a first bridge-link-portion extending from a first handle-body-portion;
a second handle part having a second bridge-link-portion extending from a second handle-body-portion;
an elongate bridge with a first half of the elongate bridge in sliding engagement with the first bridge-link-portion of the first handle part along a longitudinal axis of the elongate bridge and a second half of the elongate bridge in sliding engagement with the second bridge-link-portion of the second handle part along the longitudinal axis of the elongate bridge; and
an extendable arrangement interconnecting the elongate bridge, the first handle part and the second handle part in a manner so as to synchronously extend and retract the first handle part and the second handle part uniformly in opposite directions with respect to the elongate bridge along an extension axis, the extension axis being parallel to or coincide with the longitudinal axis of the elongate bridge,
wherein the extendable arrangement includes
a first pulley rotatably coupled to a first end portion of the elongate bridge in a manner so as to be rotatable about a first rotational axis perpendicular to the extension axis,
a second pulley rotatably coupled to a second end portion of the elongate bridge in a manner so as to be rotatable about a second rotational axis perpendicular to the extension axis, the second rotational axis being parallel to the first rotational axis,
a continuous endless belt looped over the first pulley and the second pulley,
a first elongate member disposed parallel to the extension axis with a first end portion coupled to the first handle part and a second end portion coupled to a first segment of the continuous endless belt, and
a second elongate member disposed parallel to the extension axis with a first end portion coupled to the second handle part and a second end portion coupled to a second segment of the continuous endless belt, the first segment of the continuous endless belt and the second segment of the continuous endless belt being on opposite sides of the continuous endless belt across the extension axis.

In Example 19, the subject matter of Example 18 may optionally include that the extendable arrangement may further include a first biasing element connected between the first handle part and the first end portion of the elongate bridge, the first biasing element being configured to bias against extending the first handle part from the elongate bridge along the extension axis, and a second biasing element connected between the second handle part and the second end portion of the elongate bridge, the second biasing element being configured to bias against extending the second handle part from the elongate bridge along the extension axis.

In Example 20, the subject matter of Example 18 or 19 may optionally include that each of the first biasing element and the second biasing element may be a tension spring or extension spring.

In Example 21, the subject matter of any one of Examples 18 to 20 may optionally include that the first segment of the continuous endless belt may include an interlocking arrangement and the second end portion of the first elongate member may include a complementary interlocking arrangement, wherein the interlocking arrangement of the first segment of the continuous endless belt and the complementary interlocking arrangement of the first elongate member may be interlocked with each other so as to couple the second end portion of the first elongate member to the first segment of the continuous endless belt, and the second segment of the continuous endless belt may include an interlocking arrangement and the second end portion of the second elongate member may include a complementary interlocking arrangement, wherein the interlocking arrangement of the second segment of the continuous endless belt and the complementary interlocking arrangement of the second elongate member may be interlocked with each other so as to couple the second end portion of the second elongate member to the second segment of the continuous endless belt.

In Example 22, the subject matter of Example 21 may optionally include that the interlocking arrangement of the first segment of the continuous endless belt may include a protrusion and the complementary interlocking arrangement of the first elongate member may include a notch, and the interlocking arrangement of the second segment of the continuous endless belt may include a protrusion and the complementary interlocking arrangement of the second elongate member may include a notch.

In Example 23 the subject matter of any one Examples 18 to 22 may optionally include that the continuous endless belt may be a toothed belt, and each of the first pulley and the second pulley may be a toothed pulley.

In Example 24, the subject matter of any one of Examples 18 to 23 may optionally include a first guide pin disposed at the first end portion of the elongate bridge, and a second guide pin disposed at the second end portion of the elongate bridge, wherein the first elongate member may include an elongate slot extending longitudinally along a length of the first elongate member, and the first guide pin is fitted through the elongate slot of the first elongate member to guide a longitudinal movement of the first elongate member, wherein the second elongate member may include an elongate slot extending longitudinally along a length of the second elongate member, and the second guide pin is fitted through the elongate slot of the second elongate member to guide a longitudinal movement of the second elongate member.

In Example 25, the subject matter of any one of Examples 18 to 24 may optionally include the first bridge-link-portion may be of a sleeve-like structure fitted over the first half of the elongate bridge, and the second bridge-like-portion may be of a sleeve-like structure fitted over the second half of the elongate bridge.

In Example 26, the subject matter of any one of Examples 18 to 25 may optionally include an electrical cable extending between the first handle part and the second handle part.

In Example 27, the subject matter of Example 26 may optionally include that the electrical cable may extend along the first bridge-link-portion, the elongate bridge and the second bridge-link portion.

In Example 28, the subject matter of Example 26 or 27 may optionally include that the electrical cable may include a flexible flat cable, a flexible cable, a ribbon cable, a coaxial cable, or a wire.

Example 29 is an extendable controller including a handle part;

an elongate bridge retractably extendable with respect to the handle part along a longitudinal axis of the elongate bridge;

a link member disposed between the handle part and the elongate bridge, wherein an end portion of the elongate bridge is in sliding engagement with the link member so as to be retractably extendable relative to the link member along the longitudinal axis of the elongate bridge, wherein the link member is movable relative to the handle part between a retracted position and an extended position along an extension axis parallel to or coincident with the longitudinal axis of the elongate bridge; and a movement control arrangement operatively connected between the link member and the handle part to restrain the link member from moving between the retracted position and the extended position relative to the handle part when the link member is in the retracted position and in the extended position respectively, wherein the movement control arrangement includes an input interface operable to release the link member from being restrained, when the link member is in the retracted position and in the extended position respectively, such that the link member is movable between the retracted position and the extended position relative to the handle part.

In Example 30, the subject matter of Example 29 may optionally include that the movement control arrangement may include a translating cam mechanism, wherein the translating cam mechanism may include a cam plate fixedly disposed at the link member and a follower associated with the handle part, wherein the follower may be non-movable relative to the handle part in a direction parallel to the extension axis of the link member relative to the handle part.

In Example 31, the subject matter of Example 30 may optionally include that the cam plate may include a cam track having a first pit at a first end of the cam track and a second pit at a second end of the cam track, the first end of the cam track and the second end of the cam track being opposite each other with respect to the extension axis of the link member, wherein the link member may be restrained in the retracted position when the follower drops into the first pit of the cam track and the link member may be being restrained in the extended position when the follower drops into the second pit of the cam track.

In Example 32, the subject matter of Example 31 may optionally include that the cam track may include a closed loop track, wherein the closed loop track may include four straight sections arranged in a rhombus formation, wherein the first pit and the second pit may be at two opposite corners of the rhombus formation.

In Example 33, the subject matter of Example 32 may optionally include that the cam track may include a first straight section followed by a second straight section from the first pit to the second pit, wherein the cam track may include a cam profile having a sharp rise at a transition between the first pit and the first straight section and a continuous gradual return along the first straight section and the second straight section towards the second pit.

In Example 34, the subject matter of Example 33 may optionally include that the sharp rise at the transition between the first pit and the first straight section may be in the form of a wall or a steep surface extending along a corresponding side of the first pit so as to serve as a stopper blocking the follower from crossing over from the first pit to the first straight section while the follower is in the first pit in order to restrain the link member when the link member is in the retracted position.

In Example 35, the subject matter of Example 34 may optionally include that the input interface of the movement control arrangement may be operable to lift the follower over the sharp rise to cross over from the first pit to the first straight section so as to release the link member from being restrained such that the link member may be movable relative to the handle part with the follower following along the first straight section and the second straight section.

In Example 36, the subject matter of Example 35 may optionally include that the cam profile may include a sharp drop at a transition between the second straight section and the second pit, wherein, when the follower crosses over the sharp drop into the second pit, the sharp drop may serve as a stopper blocking the follower from crossing back from the second pit to the second straight section so as to restrain the follower in the second pit in order to restrain the link member when the link member is in the extended position.

In Example 37, the subject matter of any one of Examples 33 to 36 may optionally include that the closed loop track may include a third straight section followed by a fourth straight section from the second pit to the first pit, wherein the cam profile of the closed loop track may have a further sharp rise at a transition between the second pit and the third straight section and a further continuous gradual return along the third straight section and the fourth straight section towards the first pit.

In Example 38, the subject matter of Example 37 may optionally include that the further sharp rise at the transition between the second pit and the third straight section may be in the form of a wall or a steep surface extending along a corresponding side of the second pit so as to serve as a stopper blocking the follower from crossing over from the second pit to the third straight section while the follower is in the second pit in order to restrain the link member when the link member is in the extended position.

In Example 39, the subject matter of Example 38 may optionally include that the input interface of the movement control arrangement may be operable to lift the follower over the further sharp rise to cross over from the second pit to the third straight section so as to release the link member from being restrained such that the link member may be movable relative to the handle part with the follower following along the third straight section and the fourth straight section.

In Example 40, the subject matter of Example 39 may optionally include that the cam profile may include a further sharp drop at a transition between the fourth straight section and the first pit, wherein, when the follower crosses over the further sharp drop into the first pit, the further sharp drop may serves as a stopper blocking the follower from crossing back from the first pit to the fourth straight section so as to restrain the follower in the first pit in order to restrain the link member when the link member is in the retracted position.

In Example 41, the subject matter of any one of Examples 31 to 40 may optionally include that the movement control arrangement may include a follower-biasing-member operatively connected between the handle part and the follower to exert a biasing force on the follower so as to urge a tip of the follower to towards the cam track.

In Example 42, the subject matter of Example 41 may optionally include that the input interface of the movement control arrangement may include a pusher disposed to engage the follower in a manner such that the input interface is operable to drive the pusher to apply a force on the follower to counteract the biasing force of the follower-biasing-member so as to lift the tip of the follower away from the cam track.

In Example 43, the subject matter of Example 41 or 42 may optionally include that the follower-biasing-member may include a leaf spring or a torsion spring coupled to the handle part and with a leg of the leaf spring or the torsion spring in engagement with the follower to exert the biasing force on the follower.

In Example 44, the subject matter of any one of Examples 29 to 43 may optionally include a motion-assistance arrangement operatively connected between the link member and the handle part to actuate the link member so as to automate movement of the link member relative to the handle part between the retracted position and the extended position when the input interface is operated to release the link member from being restrained.

In Example 45, the subject matter of Example 44 may optionally include that the motion-assistance arrangement may include a link-member-biasing sub-arrangement connected between the handle part and the link member, wherein, when the link member is in the retracted position, the link-member-biasing sub-arrangement may apply a biasing force to urge the link member to move relative to the handle part from the retracted position towards the extended position.

In Example 46, the subject matter of Example 45 may optionally include that, when the link member is in the extended position, the link-member-biasing sub-arrangement may apply a biasing force to urge the link member to move relative to the handle part from the extended position towards the retracted position.

In Example 47, the subject matter of Example 45 may optionally include that the link-member-biasing sub-arrangement may include a pair of coil springs disposed on opposite sides of the link member across the extension axis, wherein a first end of each coil spring may be coupled to the link member and a second end of each coil spring may be coupled to the handle part, wherein, when the link member is in the retracted position, each coil spring may be in tension and may be oriented to form an acute angle with respect to the extension axis, whereby the second end of each coil spring may be forward of the first end of each coil spring with respect to a direction of extension along the extension axis.

In Example 48, the subject matter of Example 46 may optionally include that the link-member-biasing sub-arrangement may include a pair of coil springs disposed on opposite sides of the link member across the extension axis, wherein a first end of each coil spring may be pivotably coupled to the link member and a second end of each coil spring may be pivotably coupled to the handle part, wherein, when the link member is in the retracted position, each coil spring may be in tension and may be oriented to form an acute angle with respect to the extension axis, whereby the second end of each coil spring may be forward of the first end of each coil spring with respect to a direction of extension along the extension axis, wherein, when the link member in the retracted position is released from being restrained via the input interface, each coil spring may contract to exert the biasing force to move the link member from the retracted position towards the extended position along the extension axis, pivot about the second end thereof with respect to the handle part, and extend with the first end thereof stretching away from the second end in the direction of extension as an extension momentum continues to move the link member towards the extended position until the link member is restrained in the extended position, wherein, when the link member is in the extended position, each coil spring may be in tension and may be oriented to form an acute angle with respect to the extension axis, whereby the second end of each coil spring may be forward of the first end of each coil spring with respect to a direction of retraction along the extension axis, the direction of retraction and the direction of extension being opposite directions along the extension axis, wherein, when the link member in the extended position is released from being restrained via the input interface, each coil spring may contract to exert the biasing force to move the link member from the extended position towards the retracted position along the extension axis, pivot about the second end thereof with respect to the handle part, and extend with the first end thereof stretching away from the second end in the direction of retraction as a retraction momentum continues to move the link member towards the retracted position until the link member is restrained in the retracted position.

Figure 1B:
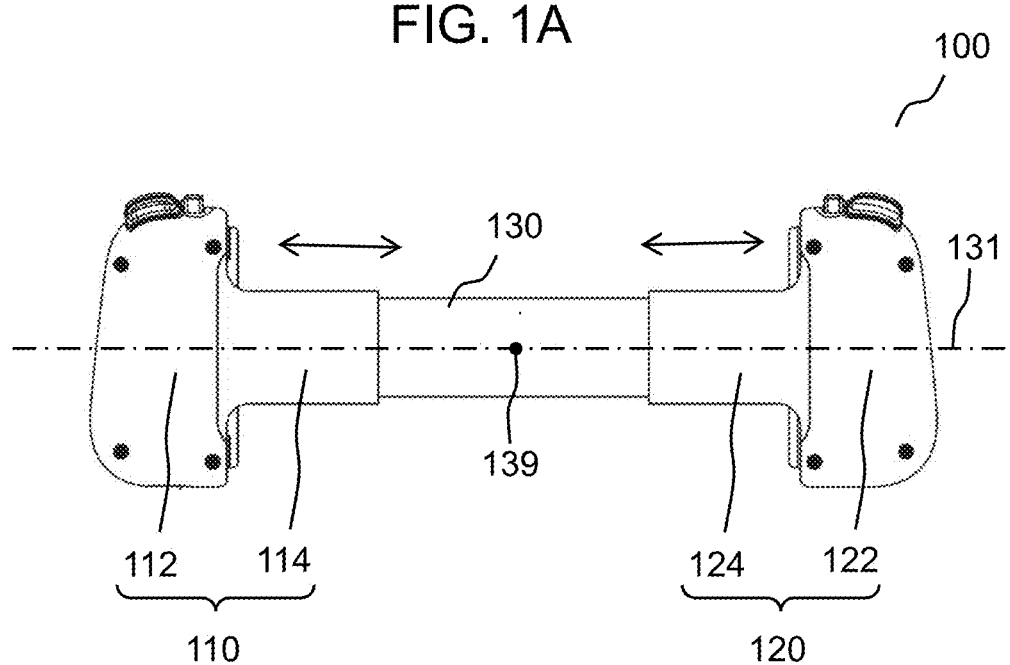
FIG. 1B shows a back view of the extendable controller of FIG. 1A in an extended state according to various embodiments.

FIG. 1A shows a back view of an extendable controller 100 in a retracted state according to various embodiments. FIG. 1B shows a back view of the extendable controller 100 of FIG. 1A in an extended state according to various embodiments. According to various embodiments, the extendable controller 100 may include a first handle part 110 and a second handle part 120. According to various embodiments, the extendable controller 100 may include an elongate bridge 130 disposed between the first handle part 110 and the second handle part 120. According to various embodiments, the elongate bridge 130 may be a long structure serving as an intermediate piece bridging (or bringing together) the first handle part 110 and the second handle part 120. The first handle part 110 may be in sliding engagement with a first half of the elongate bridge 130 so as to be slidable relative to the elongate bridge 130 along a longitudinal axis of the elongate bridge 130, and the second handle part 120 may be in sliding engagement with a second half of the elongate bridge 130 so as to be slidable relative to the elongate bridge 130 along the longitudinal axis of the elongate bridge 130. According to various embodiments, the first half of the elongate bridge 130 may be half of a length of the elongate bridge and the second half of the elongate bridge 130 may other half of the length of the elongate bridge. According to various embodiments, the first handle part 110 and the second handle part 120 may be slidden away from each other in a synchronous (or simultaneous) and uniform (or symmetric) manner relative to the elongate bridge 130 such that a mid-point 139 of the elongate bridge 130 may remain at a middle of the extendable controller 100 regardless of whether the extendable controller 100 is in the retracted state, or is undergoing extension, or is in the extended state. Similarly, the first handle part 110 and the second handle part 120 may be slidden towards each other in a synchronous and uniform manner relative to the elongate bridge 130 when retracting from the extended state to the retracted state. Accordingly, the first handle part 110 and the second handle part 120 may be synchronously (or simultaneously) extended and retracted uniformly (or symmetrically) relative to the elongate bridge 130 in opposite directions with respect to a longitudinal axis 131 of the elongate bridge 130. Hence, during extension, the first handle part 110 and the second handle part 120 may be moved outwards relative to the elongate bridge 130 away from each other in opposite directions, and, during retraction, the first handle part 110 and the second handle part 120 may be moved inwards away towards each other in opposite directions relative to the elongate bridge 130.

According to various embodiments, the first handle part 110 may include a first handle-body-portion 112 and a first bridge-link-portion 114 extending from the first handle-body-portion 112. Accordingly, the first bridge-link-portion 114 may resemble an appendage joined to the first handle-body-portion 112 to form the first handle part 110. According to various embodiments, the second handle part 120 may include a second handle-body-portion 122 and a second bridge-link-portion 124 extending from the second handle-body portion 122. Accordingly, the second bridge-link-portion 124 may resemble an appendage joined to the second handle-body-portion 122 to form the second handle part 120.

According to various embodiments, the first bridge-link-portion 114 of the first handle part 110 may be in sliding engagement with the first half of the elongate bridge 130 such that the first handle part 110 may be slidable relative to the elongate bridge 130 along the longitudinal axis 131 of the elongate bridge 130. Accordingly, in the retracted state, the first bridge-link-portion 114 of the first handle part 110 may overlap with the first half of the elongate bridge 130. Further, in the extended state, the first bridge-link-portion 114 of the first handle part 110 may be extended longitudinally out from the first half of the elongate bridge 130 in a manner such that the first handle-body-portion 112 is moved outwards and away from the elongate bridge 130. Hence, a distance from the first handle-body-portion 112 to the mid-point 139 of the elongate bridge 130 is increased from the retracted state to the extended state.

According to various embodiments, the second bridge-link-portion 124 of the second handle part 120 may be in sliding engagement with the second half of the elongate bridge 130 such that the second handle part 120 may be slidable relative to the elongate bridge 130 along the longitudinal axis 131 of the elongate bridge 130. Accordingly, in the retracted state, the second bridge-link-portion 124 of the second handle part 120 may overlap with the second half of the elongate bridge 130. In the extended state, the second bridge-link-portion 124 of the second handle part 120 may be extended longitudinally out from the second half of the elongate bridge 130 in a manner such that the second handle-body-portion 122 is moved outwards and away from the elongate bridge 130. Hence, a distance from the second handle-body-portion 122 to the mid-point 139 of the elongate bridge 130 is increased from the retracted state to the extended state.

According to various embodiments, when the first handle part 110 and the second handle part 120 are synchronously (or simultaneously) extended out from the elongate bridge 130 in opposite directions, the first bridge-link-portion 114 of the first handle part 110 and the second bridge-link-portion 124 of the second handle part 120 may synchronously (or simultaneously) slide longitudinally away from each other and outwards relative to the elongate bridge 130 in a uniform (or symmetric) manner to lengthen a distance apart between the first handle-body-portion 112 and the second handle-body-portion 122. According to various embodiments, when the first handle part 110 and the second handle part 120 are synchronously (or simultaneously) retracted back relative to the elongate bridge 130 in opposite directions, the first bridge-link-portion 114 of the first handle part 110 and the second bridge-link-portion 124 of the second handle part 120 may synchronously (or simultaneously) slide longitudinally towards each other and inwards relative to the elongate bridge 130 in a uniform (or symmetric) manner to shorten a distance apart between the first handle-body-portion 112 and the second handle-body-portion 122.

Figure 2A:
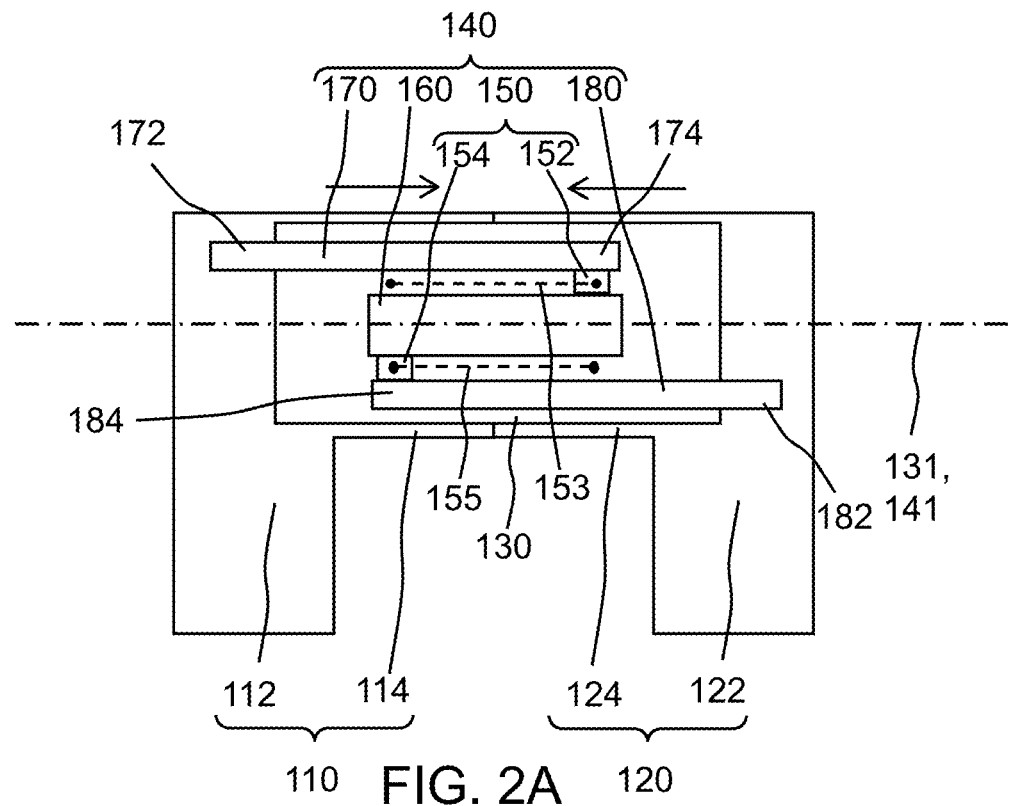
FIG. 2A shows a schematic diagram of the extendable controller of FIG. 1A in the retracted state, with an extendable arrangement illustrated, according to various embodiments.
Figure 2B:
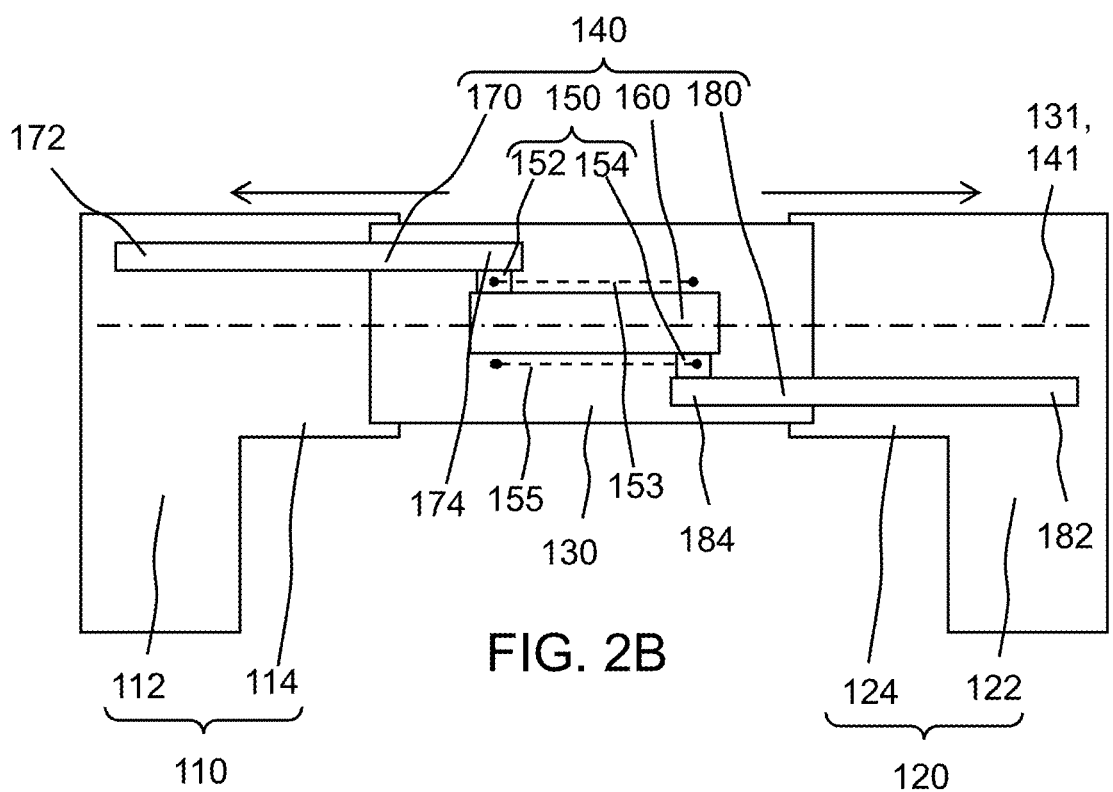
FIG. 2B shows a schematic diagram of the extendable controller of FIG. 2A in the extended state, with the extendable arrangement illustrated, according to various embodiments.

FIG. 2A shows a schematic diagram of the extendable controller 100 in a retracted state, with an extendable arrangement 140 illustrated, according to various embodiments. FIG. 2B shows a schematic diagram of the extendable controller 100 in an extended state, with the extendable arrangement 140 illustrated, according to various embodiments.

According to various embodiments, the extendable controller 100 may include the extendable arrangement 140. According to various embodiments, the extendable arrangement 140 may interconnect the elongate bridge 130, the first handle part 110 and the second handle part 120. According to various embodiments, the extendable arrangement 140 may provide or establish the relationship and/or association among the elongate bridge 130, the first handle part 110 and the second handle part 120 such that they (i.e. the elongate bridge 130, the first handle part 110 and the second handle part 120) may interoperate or cooperatively work together synchronously (or simultaneously) for the extendable controller 100 to be extended (or pulled apart) and retracted in a uniform (or symmetric) manner relative to a center of the extendable controller 100 (e.g. the mid-point 139 of the elongate bridge 130). Accordingly, the extendable arrangement 140 may manage relative movements of the elongate bridge 130, the first handle part 110 and the second handle part 120, and/or cause (or bring about or effect) the motions required for the first handle part 110 and the second handle part 120 to be synchronously (or simultaneously) extended and retracted uniformly (or symmetrically) relative to the elongate bridge 130 in opposite directions along an extension axis 141 of the extendable arrangement 140. The extension axis 141 of the extendable arrangement 140 may be parallel or coincide with the longitudinal axis 131 of the elongate bridge 130. According to various embodiments, when the first handle part 110 is extended from the elongate bridge 130, the extendable arrangement 140 may cause the second handle part 120 to extend from the elongate bridge 130 in tandem with the first handle part 110 to achieve synchronous (or simultaneous) and uniform (or symmetric) extension. Similarly, when the second handle part 120 is extended from the elongate bridge 130, the extendable arrangement may cause the first handle part 110 to extend from the elongate bridge 130 in tandem with the second handle part 120 to achieve synchronous (or simultaneous) and uniform (or symmetric) extension. According to various embodiments, the extendable arrangement 140 may interconnect the elongate bridge 130, the first handle part 110 and the second handle part 120 in a manner so as to synchronously (or simultaneously) extend and retract the first handle part 110 and the second handle part 120 uniformly in opposite directions relative to the elongate bridge 130 along the extension axis 141 of the extendable arrangement 140.

According to various embodiments, the extendable arrangement 140 may include a dual-reciprocating-opposite-motion-carrier system 150. According to various embodiments, the dual-reciprocating-opposite-motion-carrier system 150 may be within the elongate bridge 130. According to various embodiments, various components and/or elements of the dual-reciprocating-opposite-motion-carrier system 150 may be disposed or located within the elongate bridge 130. Accordingly, the dual-reciprocating-opposite-motion-carrier system 150 may be confined or contained within the elongate bridge 130. Further, according to various embodiments, the elongate bridge 130 may support or hold or bear or maintain the dual-reciprocating-opposite-motion-carrier system 150 such that the dual-reciprocating-opposite-motion-carrier system 150 may be operating or running within the elongate bridge 130.

According to various embodiments, the dual-reciprocating-opposite-motion-carrier system 150 may include a first reciprocating carrier 152 and a second reciprocating carrier 154. According to various embodiments, each of the first reciprocating carrier 152 and the second reciprocating carrier 154 may be capable of repetitive forward and backward motion (or back-and-forth motion) relative to the elongate bridge 130. According to various embodiments, the first reciprocating carrier 152 may be movable along a first carrier-path 153 relative to the elongate bridge 130. Accordingly, the first reciprocating carrier 152 may be movable in a reciprocal manner along the first carrier-path 153. According to various embodiments, the first reciprocating carrier 152 may be movable within the elongate bridge 130. Accordingly, the first carrier-path 153 may be within a boundary of the elongate bridge 130 such that the first reciprocating carrier 152 may move within the boundary of the elongate bridge 130. Hence, the first carrier-path 153 may not extend beyond the boundary of the elongate bridge 130. According to various embodiments, the second reciprocating carrier 154 may be movable along a second carrier-path 155 relative to the elongate bridge 130. Accordingly, the second reciprocating carrier 154 may be movable in a reciprocal manner along the second carrier-path 155. According to various embodiments, the second reciprocating carrier 154 may be movable within the elongate bridge 130. Accordingly, the second carrier-path 155 may be within a boundary of the elongate bridge 130 such that the second reciprocating carrier 154 may move within the boundary of the elongate bridge 130. Hence, the second carrier-path 155 may not extend beyond the boundary of the elongate bridge 130.

According to various embodiments, operating the dual-reciprocating-opposite-motion-carrier system 150 may always move the first reciprocating carrier 152 and the second reciprocating carrier 154 synchronously (or simultaneously) in opposite directions with respect to each other and relative to the elongate bridge 130. For example, the first reciprocating carrier 152 and the second reciprocating carrier 154 may synchronously (or simultaneously) move towards each other, pass each other, and away from each other. According to various embodiments, when the dual-reciprocating-opposite-motion-carrier system 150 is in operation, the first reciprocating carrier 152 and the second reciprocating carrier 154 may synchronously (or simultaneously) move in opposite directions with respect to the extension axis 141 of the extendable arrangement 140 (i.e. corresponding to the two opposite directions along the extension axis 141). For example, when the first reciprocating carrier 152 is moving from right to left relative to the elongate bridge 130 with respect to the extension axis 141 of the extendable arrangement 140, the second reciprocating carrier 154 may move from left to right relative to the elongate bridge 130 with respect to the extension axis 141 of the extendable arrangement 140 and in tandem with the movement of the first reciprocating carrier 152. Similarly, when the first reciprocating carrier 152 is moving from left to right relative to the elongate bridge 130 with respect to the extension axis 141 of the extendable arrangement 140, the second reciprocating carrier 154 may move from right to left relative to the elongate bridge 130 with respect to the extension axis 141 of the extendable arrangement 140 and in tandem with the movement of the first reciprocating carrier 152. Hence, the first reciprocating carrier 152 and the second reciprocating carrier 154 may be moved in an alternating manner and opposite to each other synchronously (or simultaneously) relative to the elongate bridge 130.

According to various embodiments, the first reciprocating carrier 152 and the second reciprocating carrier 154 may be synchronously (or simultaneously) and uniformly (or symmetrically) moved in equal and opposite motions or exact opposite motions with respect to each other and relative to the elongate bridge 130. Accordingly, the first reciprocating carrier 152 and the second reciprocating carrier 154 may be moved at a same rate of movement or speed relative to the elongate bridge 130 such that they are moving at a same speed in opposite directions with respect to each other.

According to various embodiments, the dual-reciprocating-opposite-motion-carrier system 150 may include an opposite motion mechanism 160. According to various embodiments, the opposite motion mechanism 160 may interconnect the first reciprocating carrier 152 and the second reciprocating carrier 154. According to various embodiments, the opposite motion mechanism 160 may provide or establish the relationship and/or association between the first reciprocating carrier 152 and the second reciprocating carrier 154 such that the first reciprocating carrier 152 and the second reciprocating carrier 154 may interoperate or cooperatively work together synchronously (or simultaneously) to move in opposite directions with respect to each other and/or with respect to the extension axis 141 of the extendable arrangement 140. Accordingly, the opposite motion mechanism 160 may manage movements of the first reciprocating carrier 152 and the second reciprocating carrier 154 relative to the elongate bridge 130, and/or cause (or bring about or effect) the motions required for the first reciprocating carrier 152 and the second reciprocating carrier 154 to move synchronously (or simultaneously) in opposite directions with respect to each other and/or with respect to the extension axis 141 of the extendable arrangement 140. According to various embodiments, the opposite motion mechanism 160 may be configured to move the first reciprocating carrier 152 and the second reciprocating carrier 154 in opposite directions with respect to each other and/or with respect to the extension axis 141 of the extendable arrangement 140. According to various embodiments, the opposite motion mechanism 160 may be in direct engagement or interaction or contact or connection with each of the first reciprocating carrier 152 and the second reciprocating carrier 154.

According to various embodiments, the opposite motion mechanism 160 may include a reverse motion linkage mechanism, a scissor mechanism, a lever mechanism, a single fixed pulley mechanism, a belt and pulleys mechanism, a double sliders crank mechanism, or any suitable mechanism configured to synchronously (or simultaneously) move the first reciprocating carrier 152 and the second reciprocating carrier 154 in opposite directions with respect to each other and/or with respect to the extension axis 141 of the extendable arrangement 140.

According to various embodiments, the extendable arrangement 140 may include a first elongate member 170. According to various embodiments, a first end portion 172 of the first elongate member 170 may be coupled to the first handle part 110 and a second end portion 174 of the first elongate member 170 may be coupled to the first reciprocating carrier 152 of the dual-reciprocating-opposite-motion-carrier system 150. Accordingly, with the first elongate member 170, the first handle part 110, and the first reciprocating carrier 152 coupled together as a single unitary structure, the first handle part 110 and the first reciprocating carrier 152 may move together as a single unit or complete whole. Hence, moving the first handle part 110 to extend or retract relative to the elongate bridge 130 may move the first reciprocating carrier 152 in a corresponding direction relative to the elongate bridge 130. Similarly, the first handle part 110 may be extended or retracted relative to the elongate bridge 130 when the first reciprocating carrier 152 is moved in the corresponding direction relative to the elongate bridge 130.

According to various embodiments, the extendable arrangement 140 may include a second elongate member 180. According to various embodiments, a first end portion 182 of the second elongate member 180 may be coupled to the second handle part 120 and a second end portion 184 of the second elongate member 180 may be coupled to the second reciprocating carrier 154 of the dual-reciprocating-opposite-motion-carrier system 150. Accordingly, with the second elongate member 180, the second handle part 120, and the second reciprocating carrier 154 coupled together as a single unitary structure, the second handle part 120 and the second reciprocating carrier 154 may move together as a single unit or complete whole. Hence, moving the second handle part 120 to extend or retract relative to the elongate bridge 130 may move the second reciprocating carrier 154 in a corresponding direction relative to the elongate bridge 130. Similarly, the second handle part 120 may be extended or retracted relative to the elongate bridge 130 when the second reciprocating carrier 152 is moved in the corresponding direction relative to the elongate bridge 130.

According to various embodiments, when the opposite motion mechanism 160 is operated in a first operation mode (or forward operation mode), the first reciprocating carrier 152 and the second reciprocating carrier 154 may be respectively operating in a first motion cycle (or forward motion cycle) to move synchronously (or simultaneously) in opposite directions with respect to each other and/or with respect to the extension axis 141 of the extendable arrangement 140. Accordingly, the first reciprocating carrier 152 may be moved in the first motion cycle (e.g. a forward cycle of the reciprocating motion of the first reciprocating carrier 152) relative to the elongate bridge 130. Similarly, the second reciprocating carrier 154 may be moved in the first motion cycle (e.g. a forward cycle of the reciprocating motion of the second reciprocating carrier 154) relative to the elongate bridge 130. The first motion cycle of the first reciprocating carrier 152 and the first motion cycle of the second reciprocating carrier 154 may be opposite to each other relative to the elongate bridge 130. According to various embodiments, synchronously (or simultaneously) moving the first reciprocating carrier 152 and the second reciprocating carrier 154 in the first motion cycle may synchronously (or simultaneously) move the first handle part 110 and the second handle part 120 in opposite directions relative to the elongate bridge 130 to extend the first handle part 110 and the second handle part 120 from the elongate bridge 130 synchronously (or simultaneously). According to various embodiments, the first reciprocating carrier 152 and the second reciprocating carrier 154 may be respectively operating in the first motion cycle (or forward motion cycle) uniformly (or symmetrically). Accordingly, the first reciprocating carrier 152 and the second reciprocating carrier 154 may synchronously (or simultaneously) and uniformly (or symmetrically) move the first handle part 110 and the second handle part 120 in opposite directions relative to the elongate bridge 130 to extend the first handle part 110 and the second handle part 120 from the elongate bridge 130 in a synchronous (or simultaneous) and uniform (or symmetrical) manner.

For example, when the extendable controller 100 is in the retracted state (see FIG. 2A), the first reciprocating carrier 152 may be within the second half of the elongate bridge 130 and the first bridge-link-portion 114 of the first handle part 110 may overlap with the first half of the elongate bridge 130, and the second reciprocating carrier 154 may be within the first half of the elongate bridge 130 and the second bridge-link-portion 124 of the second handle part 120 may overlap with the second half of the elongate bridge 130. During extension of the extendable controller 100, the first reciprocating carrier 152 may move from the second half of the elongate bridge 130 to the first half of the elongate bridge 130 in a manner such that the first elongate member 170 may move the first handle part 110 longitudinally outwards from the first half of the elongate bridge 130 along the extension axis 141. Similarly, during extension of the extendable controller 100, the second reciprocating carrier 154 may move from the first half of the elongate bridge 130 to the second half of the elongate bridge 130 in a manner such that the second elongate member 180 may move the second handle part 120 longitudinally outwards from the second half of the elongate bridge 130 along the extension axis 141. Thus, a direction of movement of the first reciprocating carrier 152 from the second half of the elongate bridge 130 to the first half of the elongate bridge 130 may be opposite to a direction of movement of the second reciprocating carrier 154 from the first half of the elongate bridge 130 to the second half of the elongate bridge 130.

According to various embodiments, when the opposite motion mechanism 160 is operated in a second operation mode (or reverse operation mode), the first reciprocating carrier 152 and the second reciprocating carrier 154 may be respectively operating in a second motion cycle (or reverse motion cycle) to move synchronously (or simultaneously) in opposite directions with respect to each other and/or with respect to the extension axis 141 of the extendable arrangement 140. Accordingly, the first reciprocating carrier 152 may be moved in the second motion cycle (e.g. a reverse cycle of the reciprocating motion of the first reciprocating carrier 152) relative to the elongate bridge 130. Similarly, the second reciprocating carrier 154 may be moved in the second motion cycle (e.g. a reverse cycle of the reciprocating motion of the second reciprocating carrier 154) relative to the elongate bridge 130. The second motion cycle of the first reciprocating carrier 152 and the second motion cycle of the second reciprocating carrier 154 may be opposite to each other relative to the elongate bridge 130. According to various embodiments, synchronously (or simultaneously) moving the first reciprocating carrier 152 and the second reciprocating carrier 154 in the second motion cycle may synchronously (or simultaneously) move the first handle part 110 and the second handle part 120 in opposite directions relative to the elongate bridge 130 to retract the first handle part 110 and the second handle part 120 with respect to the elongate bridge 130 synchronously (or simultaneously). According to various embodiments, the first reciprocating carrier 152 and the second reciprocating carrier 154 may be respectively operating in the second motion cycle (or reverse motion cycle) uniformly (or symmetrically). Accordingly, the first reciprocating carrier 152 and the second reciprocating carrier 154 may synchronously (or simultaneously) and uniformly (or symmetrically) move the first handle part 110 and the second handle part 120 in opposite directions relative to the elongate bridge 130 to retract the first handle part 110 and the second handle part 120 with respect to the elongate bridge 130 in a synchronous (or simultaneous) and uniform (or symmetrical) manner.

For example, when the extendable controller 100 is in the extended state (see FIG. 2B), the first reciprocating carrier 152 may be within the first half of the elongate bridge 130 and the first handle part 110 may be extended outwards from the first half of the elongate bridge 130, and the second reciprocating carrier 154 may be within the second half of the elongate bridge 130 and the second handle part 120 may extended outwards from the second half of the elongate bridge 130. During retraction of the extendable controller 100, the first reciprocating carrier 152 may move from the first half of the elongate bridge 130 to the second half of the elongate bridge 130 in a manner such that the first elongate member 170 may move the first handle part 110 longitudinally inwards towards the first half of the elongate bridge 130 along the extension axis 141 such that the first bridge-link-portion 114 of the first handle part 110 may overlap the first half of the elongate bridge 130. Similarly, during retraction of the extendable controller 100, the second reciprocating carrier 154 may move from the second half of the elongate bridge 130 to the first half of the elongate bridge 130 in a manner such that the second elongate member 180 may move the second handle part 120 longitudinally inwards towards the second half of the elongate bridge 130 along the extension axis 141 such that the second bridge-link-portion 124 of the second handle part 120 may overlap with the second half of the elongate bridge 130. Thus, a direction of movement of the first reciprocating carrier 152 from the first half of the elongate bridge 130 to the second half of the elongate bridge 130 may be opposite to a direction of movement of the second reciprocating carrier 154 from the second half of the elongate bridge 130 to the first half of the elongate bridge 130.

Referring to FIG. 2A and FIG. 2B, according to various embodiments, each of the first carrier-path 153 and the second carrier-path 155 may be straight. According to various other embodiments (not shown), each of the first carrier-path 153 and the second carrier-path 155 may be curved, wavy, zig-zag, or any other suitable path as long as the path is generally extending in the directions of the extension axis 141 of the extendable arrangement 140. Referring to FIG.

2A and FIG. 2B, according to various embodiments, each of the first carrier-path 153 and the second carrier-path 155 may be parallel to the extension axis 141. According to various embodiments, (not shown), each of the first carrier-path 153 and the second carrier-path 155 may be non-parallel to the extension axis 141 as long as the path is generally extending in the directions of the extension axis 141 of the extendable arrangement 140, for example, may be converging or diverging or skew with respect to the extension axis 141 of the extendable arrangement 140. According to various embodiments, each of the first carrier-path 153 and the second carrier-path 155 may have a profile and may be oriented such that the first reciprocating carrier 152 and the second reciprocating carrier 154 may be movable in opposite directions with respect to the extension axis 141 of the extendable arrangement 140 (i.e. corresponding to the two opposite directions along the extension axis 141).

Referring to FIG. 2A and FIG. 2B, according to various embodiments, the first carrier-path 153 and the second carrier-path 155 may be on opposite sides of the extension axis 141 of the extendable arrangement 140 (i.e. two opposites across the extension axis 141). According to various embodiments, the extension axis 141 of the extendable arrangement 140 may be along a centreline passing through the extendable arrangement 140 in the directions of extension and retraction. Accordingly, the first carrier-path 153 may be along a region of the extendable arrangement 140 on one side of the extension axis 141 (for example, above the extension axis 141) and the second carrier-path 155 may be along another region of the extendable arrangement 140 on another side of the extension axis 141 (for example, below the extension axis 141). Hence, the extension axis 141 of the extendable arrangement 140 may extend through the extendable arrangement 140 in a manner so as to set apart the first carrier-path 153 and the second carrier-path 155 on two opposite sides of the extension axis 141.

Referring to FIG. 2A and FIG. 2B, according to various embodiments, the first carrier-path 153 and the second carrier-path 155 may be equal in length and aligned to each other. According to various embodiments, with the first carrier-path 153 and the second carrier-path 155 equal in length, the first reciprocating carrier 152 and the second reciprocating carrier 154 may be moved to a same amount of displacement. According to various embodiments, the first carrier-path 153 and the second carrier-path 155 may be aligned such that a start point of the first carrier-path 153 and an end point of the second carrier-path 155 are opposite each other across the extension axis 141 and an end point of the first carrier-path 153 and a start point of the second carrier-path 155 are opposite each other across the extension axis 141.

Figure 3A:
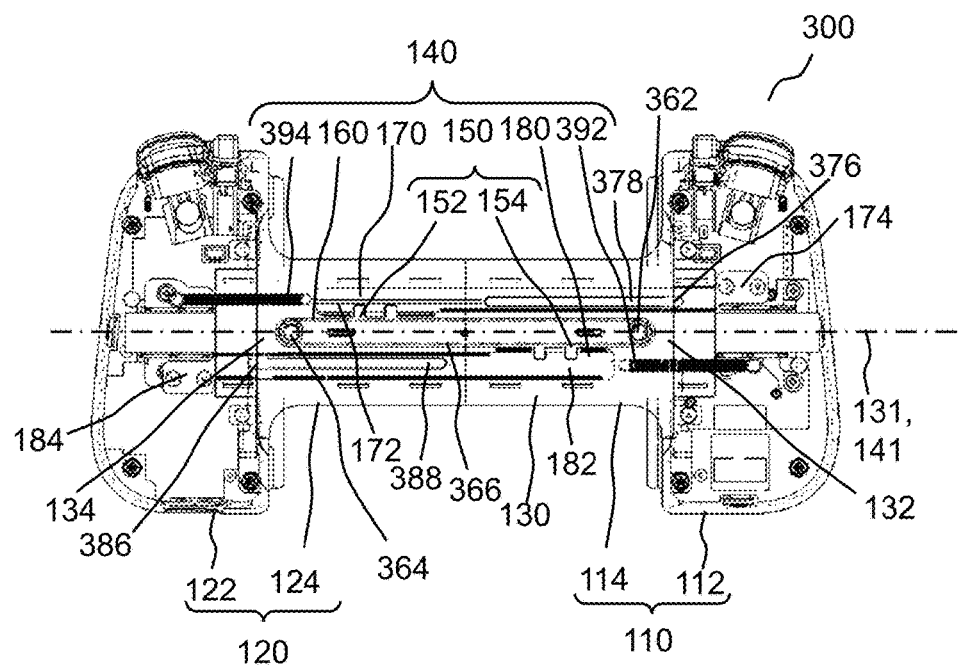
FIG. 3A shows a see-through view of an extendable controller in a retracted state according to various embodiments.
Figure 3B:
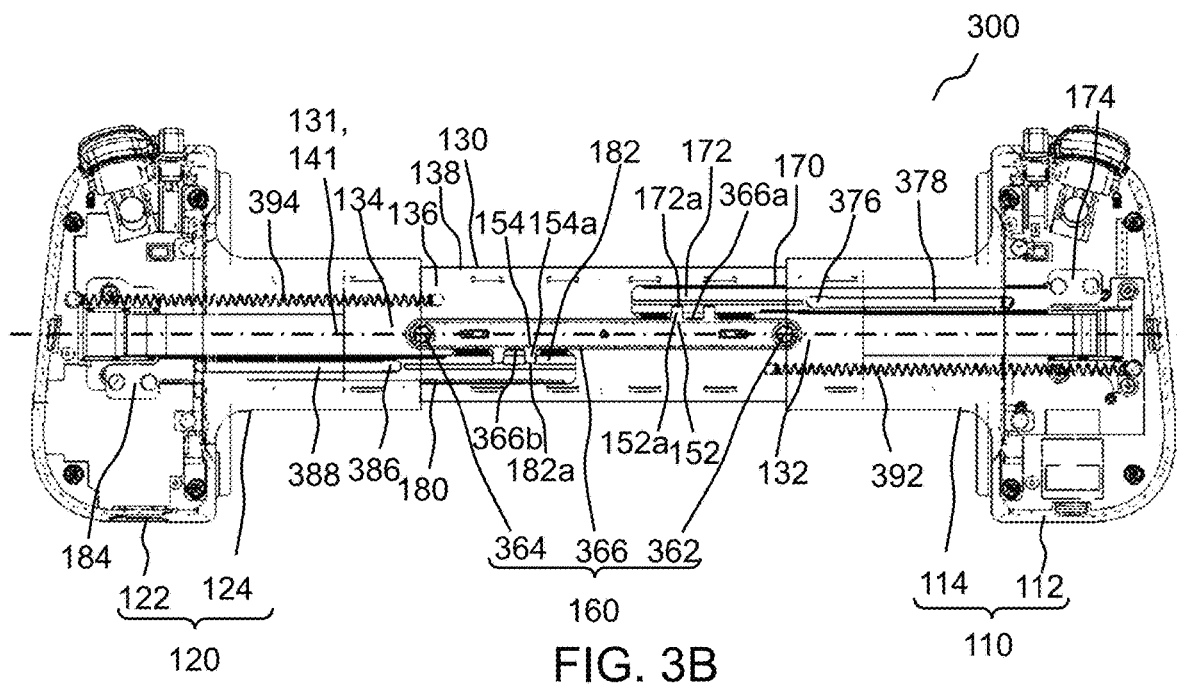
FIG. 3B shows a see-through view of the extendable controller of FIG. 3A in an extended state according to various embodiments.
Figure 4A:
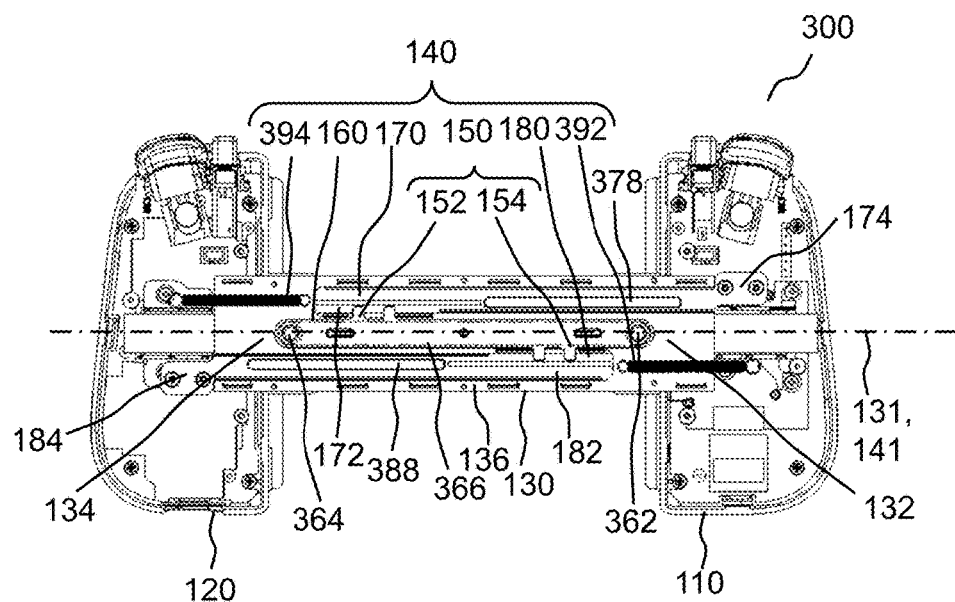
FIG. 4A shows the extendable controller of FIG. 3A, with a housing removed, in the retracted state according to various embodiments.
Figure 4B:
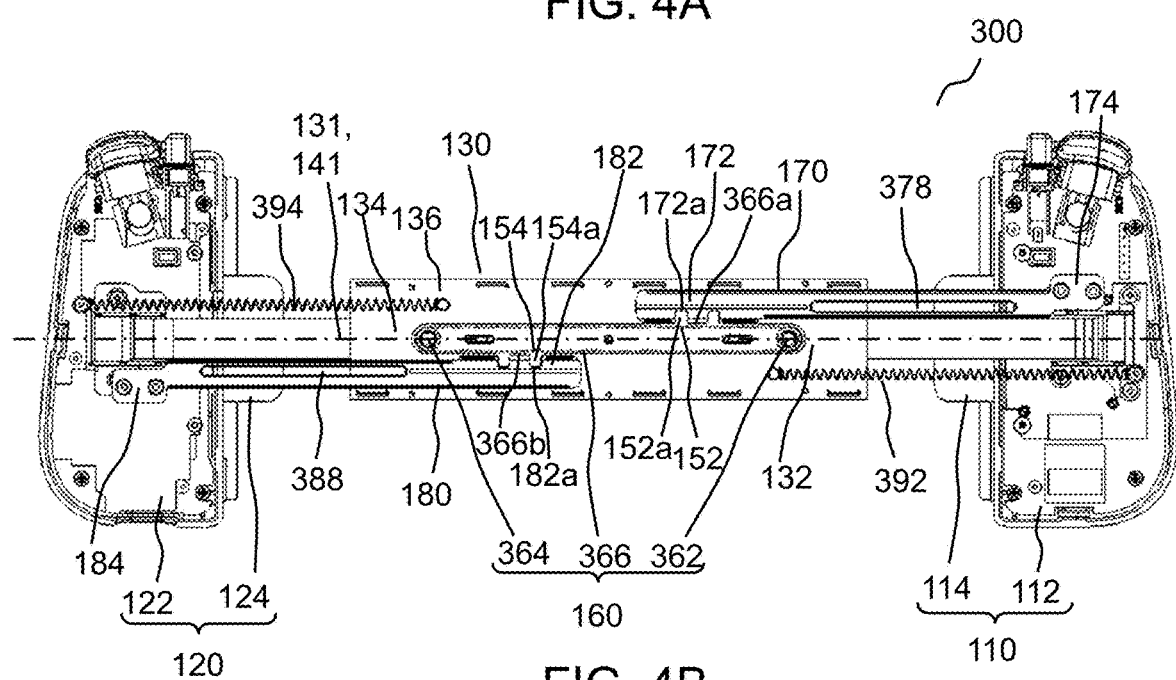
FIG. 4B shows the extendable controller of FIG. 3A, with the housing removed, in the extended state according to various embodiments.

FIG. 3A shows a see-through view of an extendable controller 300 in a retracted state according to various embodiments. FIG. 3B shows a see-through view of the extendable controller 300 in an extended state according to various embodiments. FIG. 4A shows the extendable controller 300, with a housing removed, in the retracted state according to various embodiments. FIG. 4B shows the extendable controller 300, with the housing removed, in the extended state according to various embodiments.

According to various embodiments, the extendable controller 300 of FIG. 3A to FIG. 4B includes all the features of the extendable controller 100 of FIG. 1A to FIG. 2B. Accordingly, all features, changes, modifications, and variations that are applicable to the extendable controller 100 of FIG. 1A to FIG. 2B may also be applicable to the extendable controller 300 of FIG. 3A to FIG. 4B. According to various embodiments, the extendable controller 300 of FIG. 3A to FIG. 4B may include the first handle part 110, the second handle part 120, the elongate bridge 130, and the extendable arrangement 140 (which includes the dual-reciprocating-opposite-motion-carrier system 150, the opposite motion mechanism 160, the first elongate member 170 and the second elongate member 180) as previously described in relation to the extendable controller 100 of FIG. 1A to FIG. 2B.

According to various embodiments, the opposite motion mechanism 160 of the extendable controller 300 of FIG. 3A to FIG. 4B may be a type of belt and pulleys mechanism. Referring to FIG. 3A to FIG. 4B, according to various embodiments, the opposite motion mechanism 160 of the extendable controller 300 may include a first pulley 362. According to various embodiments, the first pulley 362 may be rotatably coupled to a first end portion 132 of the elongate bridge 130 (or an outer portion of the first half of the elongate bridge 130 away from the mid-point 139 of the elongate bridge 130) in a manner so as to be rotatable about a first rotational axis perpendicular to the extension axis 141 of the extendable arrangement 140. According to various embodiments, the first rotational axis may extend through a center of the first pulley 362 such that the first pulley 362 may be rotatable about its own center. According to various embodiments, the opposite motion mechanism 160 of the extendable controller 300 may include a second pulley 364. According to various embodiments, the second pulley 364 may be rotatably coupled to a second end portion 134 of the elongate bridge 130 (or an outer portion of the second half of the elongate bridge 130 away from the mid-point 139 of the elongate bridge 130) in a manner so as to be rotatable about a second rotational axis perpendicular to the extension axis 141 of the extendable arrangement 140. According to various embodiments, the second rotational axis may extend through a center of the second pulley 364 such that the second pulley 364 may be rotatable about its own center. According to various embodiments, the second rotational axis of the second pulley 364 and the first rotational axis of the first pulley 362 may be parallel to each other.

According to various embodiments, the opposite motion mechanism 160 of the extendable controller 300 may include a continuous endless belt 366 looped over the first pulley 362 and the second pulley 364. Accordingly, the continuous endless belt 366, the first pulley 362, and the second pulley 364 may form a belt and pulleys mechanism serving as the opposite motion mechanism 160. According to various embodiments, the belt and pulleys mechanism formed by the continuous endless belt 366, the first pulley 362, and the second pulley 364 may be a conveyor-like mechanism. According to various embodiments, the continuous endless belt 366 may form a closed loop around the first pulley 362 and the second pulley 364 such that the continuous endless belt 366 may rotate about the first pulley 362 and the second pulley 364 for moving the continuous endless belt 366. According to various embodiments, the continuous endless belt 366 may rotate about the first pulley 362 and the second pulley 364 in a first direction (e.g. clockwise) and a second direction (e.g. anti-clockwise), whereby the second direction is opposite the first direction.

According to various embodiments, the first reciprocating carrier 152 may be at a first segment 366a of the continuous endless belt 366 and the second reciprocating carrier 154 may be at a second segment 366b of the continuous endless belt 366. The first segment 366a of the continuous endless belt 366 and the second segment 366b of the continuous endless belt 366 may be on opposite sides of the opposite motion mechanism 160 across the extension axis 141. Accordingly, the first segment 366a of the continuous endless belt 366 and the second segment 366b of the continuous endless belt 366 may be on opposite sides of the extension axis 141 such that the first reciprocating carrier 152 and the second reciprocating carrier 154 may be on corresponding sides of the extension axis 141. Hence, the first segment 366a of the continuous endless belt 366 together with the first reciprocating carrier 152 may be along a region of the extendable arrangement 140 on one side of the extension axis 141 (for example, above the extension axis 141) and the second segment 366b of the continuous endless belt 366 together with the second reciprocating carrier 154 may be along another region of the extendable arrangement 140 on another side of the extension axis 141 (for example, below the extension axis 141).

According to various embodiments, with the first reciprocating carrier 152 at the first segment 366a of the continuous endless belt 366 on one side of the extension axis 141 and the second reciprocating carrier 154 at the second segment 366b of the continuous endless belt 366 on an opposite side of the extension axis 141, rotating the continuous endless belt 366 about the first pulley 362 and the second pulley 364 may move the first reciprocating carrier 152 and the second reciprocating carrier 154 opposite to each other with respect to the extension axis 141 (i.e. corresponding to the two opposite directions along the extension axis 141). Accordingly, rotating the continuous endless belt 366 about the first pulley 362 and the second pulley 364 may move the first reciprocating carrier 152 in a first direction (e.g. left to right) with respect to the extension axis 141 and may move the second reciprocating carrier 154 in a second direction (e.g. right to left) with respect to the extension axis 141. The first direction and the second direction may be opposite directions with respect to each other. For example, according to various embodiments, the first direction and the second direction may be respectively parallel to opposite directions along the extension axis 141.

According to various embodiments, when the extendable controller 300 is in the retracted state, the first reciprocating carrier 152 at the first segment 366a of the continuous endless belt 366 may be proximal to the second pulley 364 (or the second end portion 134 of the elongate bridge 130) and the first bridge-link-portion 114 of the first handle part 110 may overlap with the first half of the elongate bridge 130 (or the first end portion 132 of the elongate bridge 130), and the second reciprocating carrier 154 at the second segment 366b of the continuous endless belt 366 may be proximal to the first pulley 362 (or the first end portion 132 of the elongate bridge 130) and the second bridge-link-portion 124 of the second handle part 120 may overlap with the second half of the elongate bridge 130 (or the second end portion 134 of the elongate bridge 130). Accordingly, during extension of the extendable controller 300, rotating the continuous endless belt 366 about the first pulley 362 and the second pulley 364 in the first direction (e.g. clockwise) may move the first reciprocating carrier 152 from the second pulley 364 (or the second end portion 134 of the elongate bridge 130) towards the first pulley 362 (or the first end portion 132 of the elongate bridge 130) in a manner such that the first elongate member 170 may move the first handle part 110 longitudinally outwards from the first half of the elongate bridge 130 (or first end portion 132 of the elongate bridge 130) along the extension axis 141. Similarly, during extension of the extendable controller 300, rotating the continuous endless belt 366 about the first pulley 362 and the second pulley 364 in the first direction (e.g. clockwise) may synchronously (or simultaneously) move the second reciprocating carrier 154 from the first pulley 362 (or the first end portion 132 of the elongate bridge 130) towards the second pulley 364 (or the second end portion 134 of the elongate bridge 130) in a manner such that the second elongate member 180 may move the second handle part 120 longitudinally outwards from the second half of the elongate bridge 130 (or the second end portion 134 of the elongate bridge 130) along the extension axis 141. Thus, a direction of movement of the first reciprocating carrier 152 from the second pulley 364 (or the second end portion 134 of the elongate bridge 130) towards the first pulley 362 (or the first end portion 132 of the elongate bridge 130) may be opposite to a direction of movement of the second reciprocating carrier 154 from the first pulley 362 (or the first end portion 132 of the elongate bridge 130) towards the second pulley 364 (or the second end portion 134 of the elongate bridge 130).

According to various embodiments, when the extendable controller 300 is in the extended state, the first reciprocating carrier 152 at the first segment 366a of the continuous endless belt 366 may be proximal to the first pulley 362 (or the first end portion 132 of the elongate bridge 130) and the first handle part 110 may be extended outwards from the first half of the elongate bridge 130 (or the first end portion 132 of the elongate bridge 130), and the second reciprocating carrier 154 at the second segment 366b of the continuous endless belt 366 may be proximal to the second pulley 364 (or the second end portion 134 of the elongate bridge 130) and the second handle part 120 may be extended outwards from the second half of the elongate bridge 130 (or the second end portion 134 of the elongate bridge 130). Accordingly, during retraction of the extendable controller 300, rotating the continuous endless belt 366 about the first pulley 362 and the second pulley 364 in the second direction (e.g. anti-clockwise) may move the first reciprocating carrier 152 from the first pulley 362 (or the first end portion 132 of the elongate bridge 130) towards the second pulley 364 (or the second end portion 134 of the elongate bridge 130) in a manner such that the first elongate member 170 may move the first handle part 110 longitudinally inwards to overlap with the first half of the elongate bridge 130 (or first end portion 132 of the elongate bridge 130) along the extension axis 141. Similarly, during retraction of the extendable controller 300, rotating the continuous endless belt 366 about the first pulley 362 and the second pulley 364 in the second direction (e.g. anti-clockwise) may synchronously (or simultaneously) move the second reciprocating carrier 154 from the second pulley 364 (or the second end portion 134 of the elongate bridge 130) towards the first pulley 362 (or the first end portion 132 of the elongate bridge 130) in a manner such that the second elongate member 180 may move the second handle part 120 longitudinally inwards to overlap with the second half of the elongate bridge 130 (or the second end portion 134 of the elongate bridge 130) along the extension axis 141. Thus, a direction of movement of the first reciprocating carrier 152 from the first pulley 362 (or the first end portion 132 of the elongate bridge 130) towards the second pulley 364 (or the second end portion 134 of the elongate bridge 130) may be opposite to a direction of movement of the second reciprocating carrier 154 from the second pulley 364 (or the second end portion 134 of the elongate bridge 130) towards the first pulley 362 (or the first end portion 132 of the elongate bridge 130).

According to various embodiments, since the first reciprocating carrier 152 and the second reciprocating carrier 154 are on the same continuous endless belt 366, rotating the continuous endless belt 366 about the first pulley 362 and the second pulley 364 may move the first reciprocating carrier 152 and the second reciprocating carrier 154 synchronously (or simultaneously) and uniformly (or symmetrically).

According to various embodiments, the continuous endless belt 366 may include a toothed belt, a flat belt, a round belt, a V belt, a multi-groove belt, a ribbed belt or a chain. According to various embodiments, the continuous endless belt 366 may be made of any suitable material, including but not limited to, thermoplastic polyurethane (TPU), polyurethane (PU), or styrene-ethylene-butylene-styrene (SEBS). According to various embodiments, each of the first pulley 362 and the second pulley 364 may include a corresponding toothed pulley, a flat-belt pulley, a grooved pulley, a V-grooved pulley, or a multi-grooved pulley.

According to various embodiments, the first reciprocating carrier 152 may be an integral part of the continuous endless belt 366 at the first segment 366a of the continuous endless belt 366. Similarly, according to various embodiments, the second reciprocating carrier 154 may be an integral part of the continuous endless belt 366 at the second segment 366b of the continuous endless belt 366. According to various embodiments, the first reciprocating carrier 152, the second reciprocating carrier 154 and the continuous endless belt 366 may be integrally formed or molded as a one-piece article. According to various embodiments, the first reciprocating carrier 152, the second reciprocating carrier 154 and the continuous endless belt 366 may be made of the same material. According to various embodiments, the first reciprocating carrier 152, the second reciprocating carrier 154 and the continuous endless belt 366 may be integrally joined or connected together to form a single integrated unit. According to various embodiments, the first reciprocating carrier 152, the second reciprocating carrier 154 and the continuous endless belt 366 may be made of the same or different material.

According to various embodiments, the first reciprocating carrier 152 may be coupled (or directly coupled) to the second end portion 172 of the first elongate member 170 via various suitable coupling means, including but not limited to, fastening means, interlocking means, or adhesive means. Similarly, according to various embodiments, the second reciprocating carrier 154 may be coupled (or directly coupled) to the second end portion 182 of the second elongate member 180 via various suitable coupling means, including but not limited to, fastening means, interlocking means, or adhesive means.

For example, referring to FIG. 3A to FIG. 4B, according to various embodiments, the first reciprocating carrier 152 may include an interlocking arrangement 152a and the second end portion 172 of the first elongate member 170 may include a complementary interlocking arrangement 172a. According to various embodiments, the interlocking arrangement 152a of the first reciprocating carrier 152 and the complementary interlocking arrangement 172a of the first elongate member 170 may be interlocked with each other so as to couple (or directly couple) the second end portion 172 of the first elongate member 170 to the first reciprocating carrier 152. Similarly, according to various embodiments, the second reciprocating carrier 154 may include an interlocking arrangement 154a and the second end portion 182 of the second elongate member 180 may include a complementary interlocking arrangement 182a. According to various embodiments, the interlocking arrangement 154a of the second reciprocating carrier 154 and the complementary interlocking arrangement 182a of the second elongate member 180 may be interlocked with each other so as to couple (or directly couple) the second end portion 182 of the second elongate member 180 to the second reciprocating carrier 154.

According to various embodiments, the interlocking arrangement 152a of the first reciprocating carrier 152 may be an integral part of the first reciprocating carrier 152. Similarly, the interlocking arrangement 154a of the second reciprocating carrier 154 may be an integral part of the second reciprocating carrier 152. According to various embodiments, the interlocking arrangement 152a of the first reciprocating carrier 152 may be integrally formed, molded, joined, or connected to the first reciprocating carrier 152. Similarly, according to various embodiments, the interlocking arrangement 154a of the second reciprocating carrier 154 may be integrally formed, molded, joined, or connected to the second reciprocating carrier 154. According to various embodiments, the first reciprocating carrier 152 may be configured such that the entire first reciprocating carrier 152 may be the interlocking arrangement 152a of the first reciprocating carrier 152. Similarly, according to various embodiments, the second reciprocating carrier 154 may be configured such that the entire second reciprocating carrier 154 may be the interlocking arrangement 154a of the second reciprocating carrier 154.

According to various embodiments, the complementary interlocking arrangement 172a of the second end portion 172 of the first elongate member 170 may be an integral part of the first elongate member 170. Similarly, according to various embodiments, the complementary interlocking arrangement 182a of the second end portion 182 of the second elongate member 180 may be an integral part of the second elongate member 180. According to various embodiments, the complementary interlocking arrangement 172a of the second end portion 172 of the first elongate member 170 may be integrally formed, molded, joined or connected to the first elongate member 170. Similarly, according to various embodiments, the complementary interlocking arrangement 182a of the second end portion 182 of the second elongate member 180 may be integrally formed, molded, joined or connected to the second elongate member 180.

According to various embodiments, the interlocking arrangement 152a of the first reciprocating carrier 152 and the complementary interlocking arrangement 172a of the second end portion 172 of the first elongate member 170 may be configured so as to be interlockable in a manner such that the first reciprocating carrier 152 and the second end portion 172 of the first elongate member 170 may be immovable relative to each other. Hence, the interlocking arrangement 152a of the first reciprocating carrier 152 and the complementary interlocking arrangement 172a of the second end portion 172 of the first elongate member 170 may be fitted together to ensure coordinated movement of the first reciprocating carrier 152 and the first elongate member 170 as a whole. Similarly, the interlocking arrangement 154a of the second reciprocating carrier 154 and the complementary interlocking arrangement 182a of the second end portion 182 of the second elongate member 180 may be configured so as to be interlockable in a manner such that the second reciprocating carrier 154 and the second end portion 182 of the second elongate member 180 may be immovable relative to each other. Hence, the interlocking arrangement 154a of the second reciprocating carrier 154 and the complementary interlocking arrangement 182a of the second end portion 182 of the second elongate member 180 may be fitted together to ensure coordinated movement of the second reciprocating carrier 154 and the second elongate member 180 as a whole.

For example, according to various embodiments, the interlocking arrangement 152a of the first reciprocating carrier 152 may be a protrusion and the complementary interlocking arrangement 172a of the first elongate member 170 may be a notch, or vice versa. Accordingly, the interlocking arrangement 152a of the first reciprocating carrier 152 and the complementary interlocking arrangement 172a of the first elongate member 170 may form a tongue and groove joint, or a mortise and tenon joint. Similarly, according to various embodiments, the interlocking arrangement 154a of the second reciprocating carrier 154 may be a protrusion and the complementary interlocking arrangement 182a of second elongate member 180 may be a notch, or vice versa. Accordingly, the interlocking arrangement 154a of the second reciprocating carrier 154 and the complementary interlocking arrangement 182a of second elongate member 180 may form a tongue and groove joint, or a mortise and tenon joint.

According to various embodiments, the extendable arrangement 140 of the extendable controller 300 may further include a first biasing element 392 and a second biasing element 394.

According to various embodiments, the first biasing element 392 may be connected between the first handle part 110 and the first end portion 132 of the elongate bridge 130. According to various embodiments, the first biasing element 392 may be configured to bias against extending the first handle part 110 from the elongate bridge 130 along the extension axis 141. Accordingly, the first biasing element 392 may apply a biasing force to act against (or to resist) a force pulling the first handle part 110 away from the first end portion 132 of the elongate bridge 130 when the first handle part 110 is being extended from the elongate bridge 130. Hence, the biasing force may built up in the first biasing element 392 as the first handle part 110 is being extended from the first end portion 132 of the elongate bridge 130. According to various embodiments, when the force pulling the first handle part 110 away from the first end portion 132 of the elongate bridge 130 is released, the biasing force built up in the first biasing element 392 may then retract the first handle part 110 relative to the elongate bridge 130 so as to return the first handle part 110 to the retracted state. Accordingly, the first biasing element 392 may provide the tendency or the urge for the first handle part 110 to return to the retracted state when the first handle part 110 is undergoing extension or is extended.

Similarly, according to various embodiments, the second biasing element 394 may be connected between the second handle part 120 and the second end portion 134 of the elongate bridge 130. According to various embodiments, the second biasing element 394 may be configured to bias against extending the second handle part 120 from the elongate bridge 130 along the extension axis 141. Accordingly, the second biasing element 394 may apply a biasing force to act against (or to resist) a force pulling the second handle part 120 away from the second end portion 134 of the elongate bridge 130 when the second handle part 120 is being extended from the elongate bridge 130. Hence, the biasing force may built up in the second biasing element 394 as the second handle part 120 is being extended from the second end portion 134 of the elongate bridge 130. According to various embodiments, when the force pulling the second handle part 120 away from the second end portion 134 of the elongate bridge 130 is released, the biasing force built up in the second biasing element 394 may then retract the second handle part 120 relative to the elongate bridge 130 so as to return the second handle part 120 to the retracted state. Accordingly, the second biasing element 394 may provide the tendency or the urge for the second handle part 120 to return to the retracted state when the second handle part 120 is undergoing extension or is extended.

According to various embodiments, each of the first biasing element 392 and the second biasing element 394 may include, but not limited to, a tension spring or an extension spring. According to various embodiments, for example when the first biasing element 392 is a tension spring or an extension spring, a first end of the first biasing element 392 may be coupled to the first handle part 110 and a second end of the first biasing element 392 may be coupled to the first end portion 132 of the elongate bridge 130. Similarly, According to various embodiments, for example when the second biasing element 394 is a tension spring or an extension spring, a first end of the second biasing element 394 may be coupled to the the second handle part 120 and a second end of the second biasing element 394 may be coupled to the second end portion 134 of the elongate bridge 130.

According to various embodiments, the first biasing element 392 and the first reciprocating carrier 152 may be on opposite sides of the opposite motion mechanism 160 with respect to the extension axis 141 (i.e. the two opposite sides across the extension axis 141). Accordingly, the first biasing element 392 and the first reciprocating carrier 152 may be arranged such that the first biasing element 392 may be coupled to the first end portion 132 of the elongate bridge 130 on a side of the opposite motion mechanism 160 opposite and away from the first reciprocating carrier 152 with respect to the extension axis 141 (i.e. across the extension axis 141). For example, the first biasing element 392 may be coupled to the first end portion 132 of the elongate bridge 130 on the side of the opposite motion mechanism 160 below the extension axis 141 when the first reciprocating carrier 152 is on the side of the opposite motion mechanism 160 above the extension axis 141.

Similarly, according to various embodiments, the second biasing element 394 and the second reciprocating carrier 154 may be on opposite sides of the opposite motion mechanism 160 with respect to the extension axis 141 (i.e. the two opposite sides across the extension axis 141). Accordingly, the second biasing element 394 and the second reciprocating carrier 154 may be arranged such that the second biasing element 394 may be coupled to the second end portion 134 of the elongate bridge 130 on a side of the opposite motion mechanism 160 opposite and away from the second reciprocating carrier 154 with respect to the extension axis 141 (i.e. across the extension axis). For example, the second biasing element 394 may be coupled to the second end portion 134 of the elongate bridge 130 on the side of the opposite motion mechanism 160 above the extension axis 141 when the second reciprocating carrier 154 is on the side of the opposite motion mechanism 160 below the extension axis 141.

According to various embodiments, the first elongate member 170 may be parallel to the extension axis 141, and the second elongate member 180 may be parallel to the extension axis 141. Accordingly, the first elongate member 170 and the second elongate member 180 may be parallel to each other. Hence, the first elongate member 170 and the second elongate member 180 may be movable opposite to each other (i.e. corresponding to the two opposites direction along the extension axis 141) in a parallel manner. According to various embodiments, since the first reciprocating carrier 152 and the second reciprocating carrier 154 are on opposite sides of the opposite motion mechanism 160 and the first elongate member 170 and the second elongate member 180 are respectively coupled to the first reciprocating carrier 152 and the second reciprocating carrier 154, the first elongate member 170 and the second elongate member 180 may correspondingly be on two opposites sides of the opposite motion mechanism 160 with respect to the extension axis 141 (i.e. the two opposite sides across the extension axis 141).

According to various embodiments, the extendable controller 300 may include a first guide pin 376 and a second guide pin 386. According to various embodiments, the first guide pin 376 may be disposed at the first end portion 132 of the elongate bridge 130. According to various embodiments, the first guide pin 376 may be fixed with respect to the elongate bridge 130. For example, the first guide pin 376 may be fixed to the elongate bridge 130, or a body of the elongate bridge 130, or a housing of the elongate bridge 130. According to various embodiments, the first guide pin 376 may be perpendicular to the first elongate member 170. According to various embodiments, the second guide pin 286 may be disposed at the second end portion 134 of the elongate bridge 130. According to various embodiments, the second guide pin 386 may be fixed with respect to the elongate bridge 130. For example, the second guide pin 386 may be fixed to the elongate bridge 130, or a body of the elongate bridge 130, or a housing of the elongate bridge 130. According to various embodiments, the second guide pin 286 may be perpendicular to the second elongate member 180.

According to various embodiments, the first elongate member 170 may include an elongate slot 378 extending longitudinally along a length of the first elongate member 170. According to various embodiments, the first guide pin 376 may be fitted through the elongate slot 378 of the first elongate member 170 to guide a longitudinal movement of the first elongate member 170. Accordingly, the first guide pin 376 may be fitted through the elongate slot 378 of the first elongate member 170 in a transverse manner such that moving the first elongate member 170 longitudinally may slide the first elongate member 170 relative to the first guide pin 376. According to various embodiments, the elongate slot 378 of the first elongate member 170 may also serve as a stopper or limiter which may limit a range of longitudinal movement of the first elongate member 170 as a measure to limit the amount of extension of the first handle part 110 from the elongate bridge 130.

According to various embodiments, the second elongate member 180 may include an elongate slot 388 extending longitudinally along a length of the second elongate member 180. According to various embodiments, the second guide pin 386 may be fitted through the elongate slot 388 of the second elongate member 180 to guide a longitudinal movement of the second elongate member 180. Accordingly, the second guide pin 386 may be fitted through the elongate slot 388 of the second elongate member 180 in a transverse manner such that moving the second elongate member 180 longitudinally may slide the second elongate member 180 relative to the second guide pin 386. According to various embodiments, the elongate slot 388 of the second elongate member 180 may also serve as a stopper or limiter which may limit a range of longitudinal movement of the second elongate member 180 as a measure to limit the amount of extension of the second handle part 120 from the elongate bridge 130.

According to various embodiments, the first bridge-link-portion 114 of the first handle part 110 may be of a sleeve-like structure fitted over the first half of the elongate bridge 130. According to various embodiments, the sleeve-like structure of the first bridge-link-portion 114 may be hollow such that the first half of the elongate bridge 130 may be inserted therein. According to various embodiments, the sleeve-like structure of the first bridge-link-portion 114 fitted over the first half of the elongate bridge 130 may form the sliding engagement between the first bridge-link-portion 114 of the first handle part 110 and the first half of the elongate bridge 130.

Similarly, according to various embodiments, the second bridge-link-portion 124 of the second handle part 120 may be of a sleeve-like structure fitted over the second half of the elongate bridge 130. According to various embodiments, the sleeve-like structure of the the second bridge-link-portion 124 may be hollow such that the second half of the elongate bridge 130 may be inserted therein. According to various embodiments, the sleeve-like structure of the second bridge-link-portion 124 fitted over the second half of the elongate bridge 130 may form the sliding engagement between the second bridge-link-portion 124 of the second handle part 120 and the second half of the elongate bridge 130.

According to various embodiments, the first bridge-link-portion 114 of the first handle part 110 and the second bridge-link-portion 124 of the second handle part 120 may be configured such that he first bridge-link-portion 114 of the first handle part 110 and the second bridge-link-portion 124 of the second handle part 120 may fully enclose or conceal the elongate bridge 130 when the extendable controller 300 is in the retracted state.

Figure 5A:
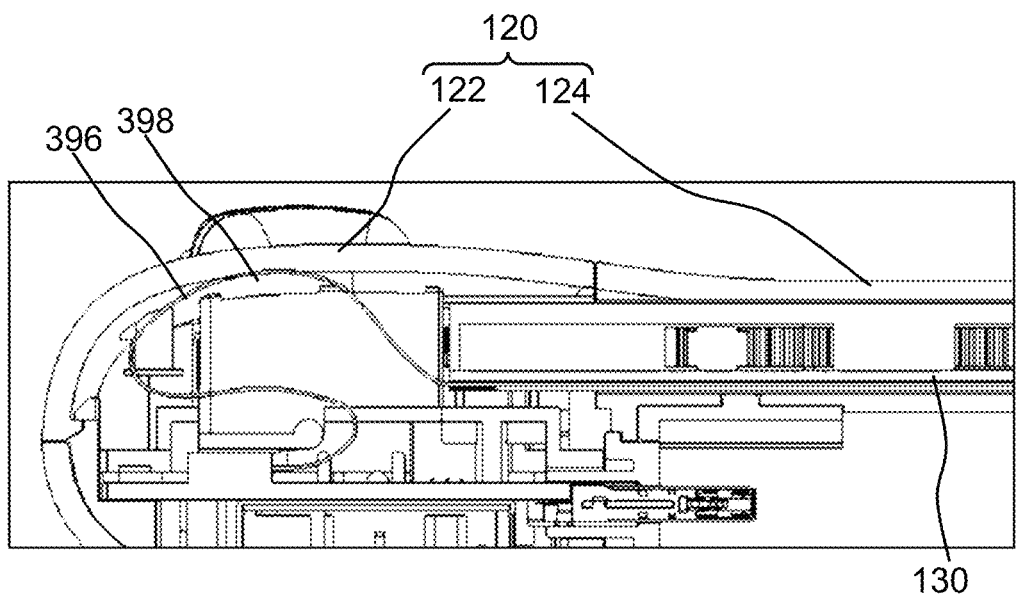
FIG. 5A shows a cross-sectional view of a second handle part of the extendable controller of FIG. 3A in the retracted state according to various embodiments.
Figure 5B:
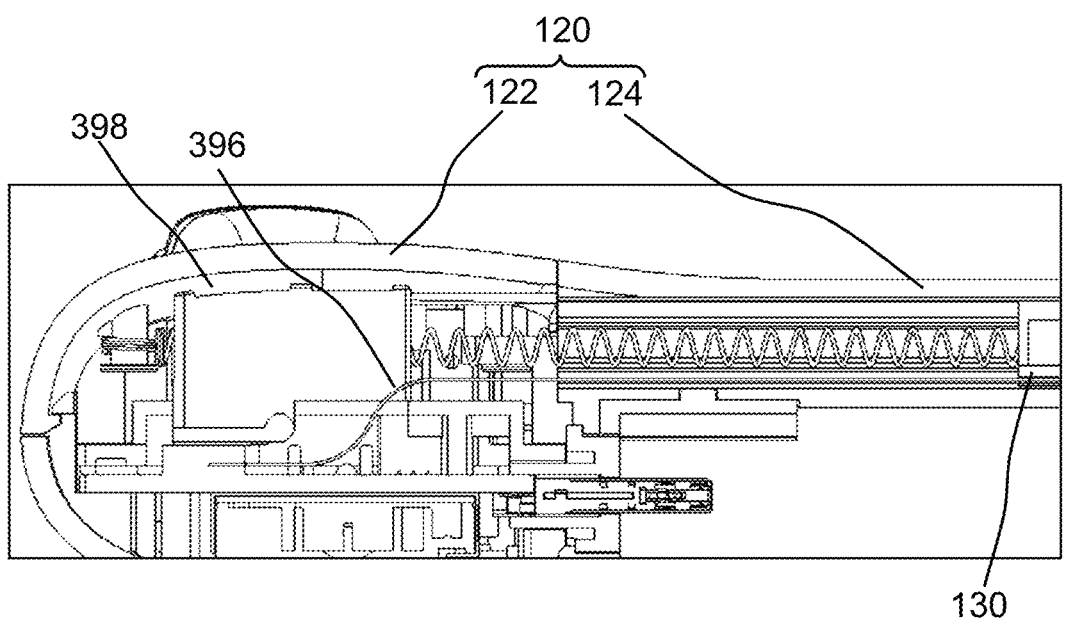
FIG. 5B shows a cross-sectional view of the second handle part of the extendable controller of FIG. 3A in the extended state according to various embodiments.

FIG. 5A shows a cross-sectional view of the second handle part 120 of the extendable controller 300 in the retracted state according to various embodiments. FIG. 5B shows a cross-sectional view of the second handle part 120 of the extendable controller 300 in the extended state according to various embodiments. According to various embodiments, the extendable controller 300 may include an electrical cable 396 extending between the first handle part 110 and the second handle part 120. According to various embodiments, the electrical cable 396 may serve to establish electrical communication between the first handle part 110 and the second handle part 120. Accordingly, control input signal received in the first handle part 110 may be shared with the second handle part 120, and vice versa. Hence, the first handle part 110 and the second handle part 120 may be operated as a single controller.

According to various embodiments, the electrical cable 396 may extend from the first handle part 110, along the first bridge-link-portion 114 of the first handle part 110, along the elongate bridge 130, and along the second bridge-link-portion 124 of the second handle part 120 to the second handle part 120. Accordingly, the electrical cable 396 may be extending alongside the extendable arrangement 140 of the extendable controller 300.

According to various embodiments, when the extendable controller 300 is fully extended, the electrical cable 396 may be fully stretched to extend between the first handle part 110 and the second handle part 120. According to various embodiments, when the extendable controller 300 is retracted, a cable management arrangement may stow the excess length of the electrical cable 396. According to various embodiments, each of the first handle-body-portion 112 of the first handle part 110 and the second handle-body-portion 122 of the second handle part 120 may include an empty inner cavity 398 for accommodating the excess length of the electrical cable 396, whereby the excess length of electrical cable 396 may curl or bend into the empty inner cavity 398 when the extendable controller 300 is retracted. Accordingly, the empty inner cavity 398 may serve as the cable management arrangement for managing the excess length of the electrical cable 396 when the extendable controller 300 is retracted.

According to various embodiments, the electrical cable 396 may include, but not limited to, a flexible flat cable, a flexible cable, a ribbon cable, a coaxial cable, or a wire.

According to various embodiments, the elongate bridge 130 may include an elongate body 136 and a hollow casing 138 coupled to the elongate body 136. The hollow casing 138 may define a through channel extending from end to end. According to various embodiments, the dual-reciprocating-opposite-motion-carrier system 150 (including the first reciprocating carrier 152, the second reciprocating carrier 154, and the opposite motion mechanism 160) may be located or disposed within the through channel of hollow casing 138 of the elongate bridge 130. For example, the dual-reciprocating-opposite-motion-carrier system 150 may be disposed on the elongate body 136 of the elongate bridge 130. According to various embodiments, the first pulley 362, the second pulley 364 and the continuous endless belt 366 may be correspondingly located or disposed within the through channel of the hollow casing 138 of the elongate bridge 130 (or disposed on the elongate body 136 of the elongate bridge 130), when the opposite motion mechanism 160 includes the first pulley 362, the second pulley 364 and the continuous endless belt 366.

Figure 6A:
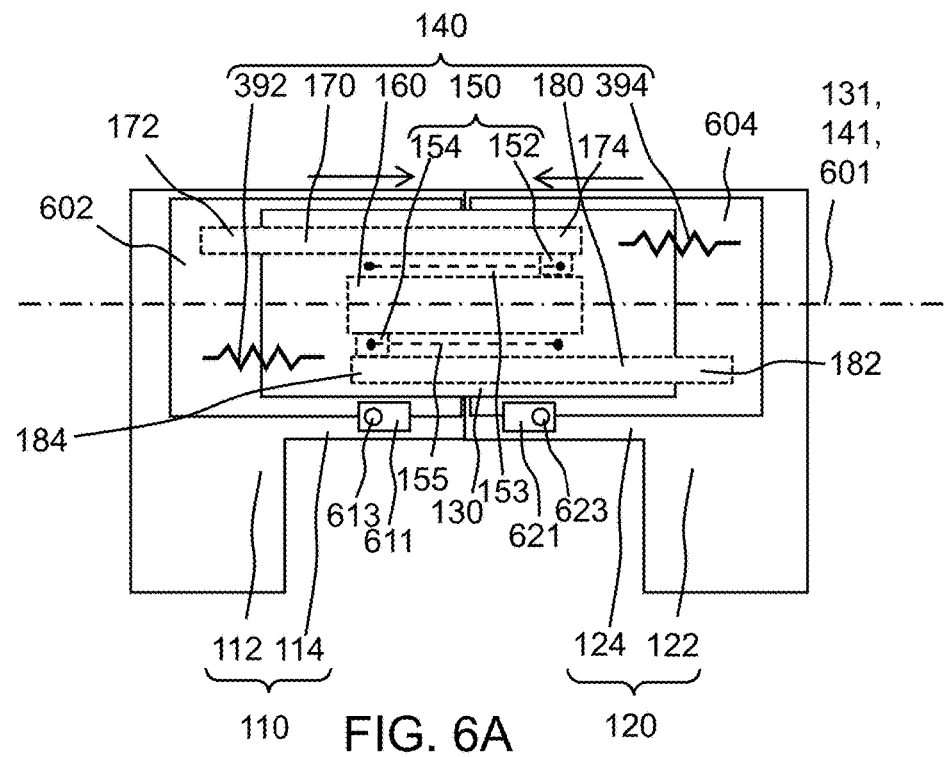
FIG. 6A shows a schematic diagram of an extendable controller in a retracted state according to various embodiments.
Figure 6B:
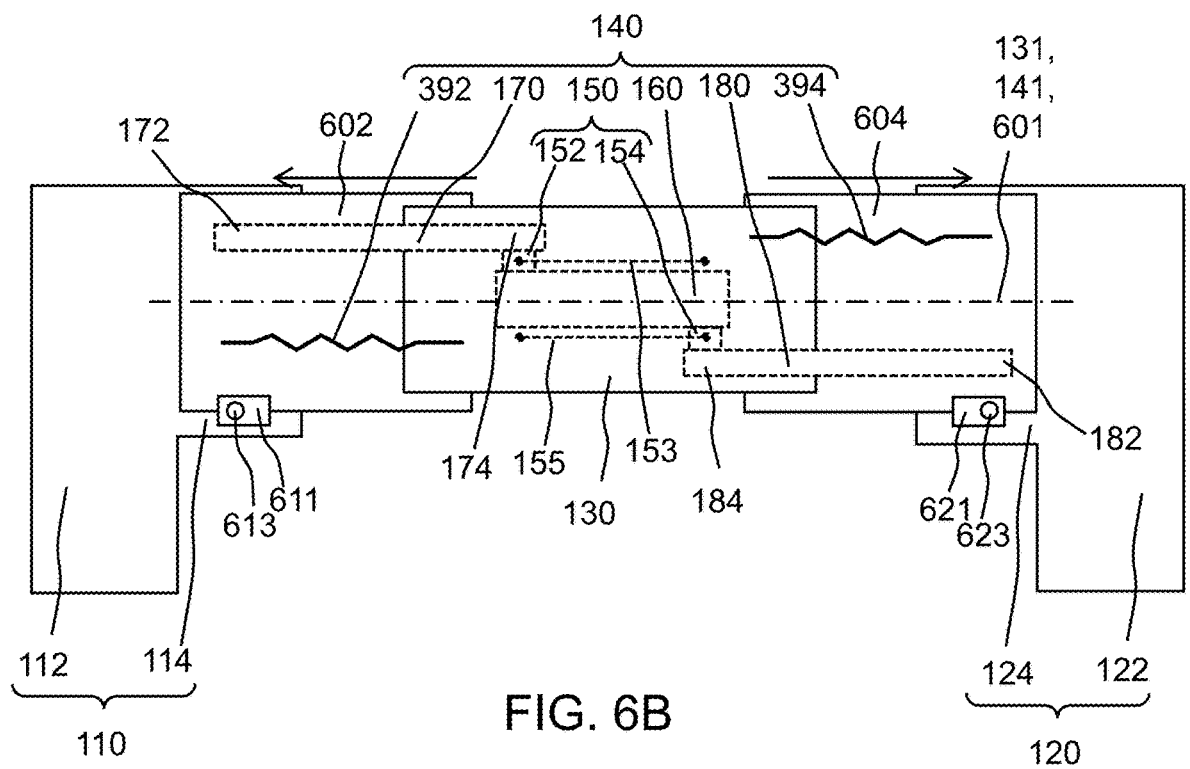
FIG. 6B shows a schematic diagram of the extendable controller of FIG. 6A in an extended state according to various embodiments.

FIG. 6A shows a schematic diagram of the extendable controller 600 in a retracted state according to various embodiments. FIG. 6B shows a schematic diagram of the extendable controller 600 in an extended state according to various embodiments. The extendable controller 600 of FIG. 6A and FIG. 6B may be a variant of the extendable controller of FIG. 1A to FIG. 2B and the extendable controller of FIG. 3A to FIG. 5B. The extendable controller 500 of FIG. 6A and FIG. 6B may include components, arrangements, elements similar to that of the extendable controller of FIG. 1A to FIG. 2B and the extendable controller of FIG. 3A to FIG. 5B. Accordingly, all features, changes, modifications, and variations that are applicable to the extendable controller 100 of FIG. 1A to FIG. 2B and the extendable controller 300 of FIG. 3A to FIG. 5B may also be applicable to the extendable controller 600 of FIG. 6A and FIG. 6B. According to various embodiments, the extendable controller 600 of FIG. 6A and FIG. 6B may include the first handle part 110, the second handle part 120, the elongate bridge 130, and the extendable arrangement 140 (which includes the dual-reciprocating-opposite-motion-carrier system 150, the opposite motion mechanism 160, the first elongate member 170 and the second elongate member 180) as previously described in relation to the extendable controller 100 of FIG. 1A to FIG. 2B and the extendable controller 300 of FIG. 3A to FIG. 5B. Therefore, elements which are the same as those described earlier are assigned the same reference numerals, and repetition of their explanations is omitted for brevity. The following descriptions focusing on the main differences in the extendable controller 600 of FIG. 6A and FIG. 6B.

According to various embodiments, the extendable controller 600 of FIG. 6A and FIG. 6B may differ from the extendable controller 100 of FIG. 1A to FIG. 2B and the extendable controller 300 of FIG. 3A to FIG. 5B in that the extendable may include a first link member 602 and a second link member 604. According to various embodiments, the first link member 602 may be disposed between the first handle part 110 and the elongate bridge 130. Similarly, the second link member 604 may be disposed between the second handle part 120 and the elongate bridge 130. According to various embodiments, the elongate bridge 130 may be a long structure serving as an intermediate piece bridging (or bringing together) the first link member 602 and the second link member 604. The first link member 602 may be in sliding engagement with the elongate bridge 130 so as to be slidable relative to the elongate bridge 130 along the longitudinal axis 131 of the elongate bridge 130, and the second link member 604 may be in sliding engagement with the elongate bridge 130 so as to be slidable relative to the elongate bridge 130 along the longitudinal axis 131 of the elongate bridge 130. According to various embodiments, a first end portion of the elongate bridge 130 may be in sliding engagement with the first link member 602 and a second end portion of the elongate bridge 130 may in sliding arrangement with the second link member 604. According to various embodiments, the first link member 602 and the second link member 604 may be slidden away from each other relative to the elongate bridge 130. For example, the first link member 602 and the second link member 604 may be slidden away in a synchronous (or simultaneous) and uniform (or symmetric) manner relative to the elongate bridge 130 such that a mid-point 139 of the elongate bridge 130 may remain at a middle of the extendable controller 100 regardless of whether the extendable controller 100 is in the retracted state, or is undergoing extension, or is in the extended state. Similarly, the first link member 602 and the second link member 604 may be slidden towards each other in a synchronous and uniform manner relative to the elongate bridge 130 when retracting from the extended state to the retracted state. Accordingly, the first link member 602 and the second link member 604 may be synchronously (or simultaneously) extended and retracted uniformly (or symmetrically) relative to the elongate bridge 130 in opposite directions with respect to the longitudinal axis 131 of the elongate bridge 130. Hence, during extension, the first link member 602 and the second link member 604 may be moved outwards relative to the elongate bridge 130 away from each other in opposite directions, and, during retraction, the first link member 602 and the second link member 604 may be moved inwards away towards each other in opposite directions relative to the elongate bridge 130. Therefore, the elongate bridge 130 may be retractactably extendable relative to each of the first link member 602 and the second link member 604 along the longitudinal axis 131 of the elongate bridge 130.

According to various embodiments, the first link member 602 may be movable relative to the first handle part 110 between a retracted position and an extended position along an extension axis 601 parallel to or coincident with the longitudinal axis of the elongate bridge 130. According to various embodiments, the second link member 604 may be movable relative to the second handle part 120 between a retracted position and an extended position along the extension axis 601 parallel to or coincident with the longitudinal axis of the elongate bridge 130. Accordingly, each of the first link member 602 and the second link member 604 may serve to provide the extendable controller 600 of FIG. 6A and FIG. 6B to have additional extension, in comparison to the extendable controller 100 of FIG. 1A to FIG. 2B and the extendable controller 300 of FIG. 3A to FIG. 5B, so as to be capable of receiving mobile phones when the first link member 602 and the second link member 604 are not in used, and capable of receiving tablets when the first link member 602 and the second link member 604 are in used.

While FIG. 6A and FIG. 6B show that the extendable controller 600 includes the first link member 602 and the second link member 604, it is understood that embodiments having a link member (e.g. the first link member 602 or the second link member 604) disposed between one of the handle part (e.g. the first handle part 110 or the second handle part 120) and the elongated bridge 130 while the other handle part (e.g. the second handle part 120 or the first handle part 110) is in direct sliding engagement with the elongated bridge 130 are also envisaged whereby description relevant to the link member (e.g. the first link member 602 or the second link member 604) in the following with reference to FIG. 6A to FIG. 9B and the description relevant to the other handle part (e.g. the second handle part 120 or the first handle part 110) is in direct sliding engagement with the elongated bridge 130 with reference to FIG. 1A to FIG. 5B may be combined.

Referring to FIG. 6A, in the retracted state of the extendable controller 600, the first bridge-link-portion 114 of the first handle part 110, the first link member 602, and the first half of the elongate bridge 130 may overlap each other. Similarly, in the retracted state, the second bridge-link-portion 124 of the second handle part 120, the second link member 604, and the second half of the elongate bridge 130 may overlap each other. Hence, in the retracted state of the extendable controller 600, a distance apart between the first handle-body-portion 112 of the first handle part 110 and the second handle-body-portion 122 of the second handle part 120 may be at a minimum. Referring to FIG. 6B, in a fully extended state of the extendable controller 600, the first link member 602 may be extended longitudinally out from the first half of the elongate bridge 130 and the first bridge-link-portion 114 of the first handle part 110 may be extended longitudinally out from the first link member 602 along the extension axis 601 in a manner such that the first link member 602 may be moved outwards and away from the elongate bridge 130 and the first handle part 110 may be moved outwards and away from the first link member 602. Similarly, in the fully extended state of the extendable controller 600, the second link member 604 may be extended longitudinally out from the second half of the elongate bridge 130 and the second bridge-link-portion 124 of the second handle part 120 may be extended longitudinally out from the second link member 604 along the extension axis 601 in a manner such that the second link member 604 may be moved outwards and away from the elongate bridge 130 and the second handle part 120 may be moved outwards and away from the second link member 604. Hence, in the fully extended state of the extendable controller 600, a distance apart between the first handle-body-portion 112 of the first handle part 110 and the second handle-body-portion 122 of the second handle part 120 may be at a maximum.

According to various embodiments, the relative movement between the first link member 602 and the first handle part 110 as well as the relative movement between the second link member 604 and the second handle part 120 may be controlled based on a need of the user. For example, when the user is using the extendable controller 600 with a tablet, the first link member 602 may be controlled to be moved and restrained in the extended position relative to the first handle part 110 and the second link member 604 may be controlled to be moved and restrained in the extended position relative to the second handle part 120 such that the user may rely on the extension provided between the first link member 602, the second link member 604 and the elongate bridge 130 for fitting the tablet to the extendable controller 600. On the other hand, when the user is using the extendable controller 600 with a mobile phone, the first link member 602 may be controlled to be moved and restrained in the retracted position relative to the first handle part 110 and the second link member 604 may be controlled to be moved and restrained in the retracted position relative to the second handle part 120 such that the extendable controller may be in an intermediate extended state whereby the user may rely on the extension provided by the elongate bridge 130 for fitting the mobile phone to the extendable controller 600.

According to various embodiments, in the intermediate extended state of the extendable controller 600, the first link member 602 may be extended longitudinally out from the first half of the elongate bridge 130 and the first bridge-link-portion 114 of the first handle part 110 may remain overlap with the first link member 602 (i.e. the first link member 602 may be in the retracted position relative to the first handle part 110) such that the first link member 602 together with the first handle part 110 may be moved outwards and away from the elongate bridge 130. Similarly, in the intermediate extended state of the extendable controller 600, the second link member 604 may be extended longitudinally out from the second half of the elongate bridge 130 and the second bridge-link-portion 124 of the second handle part 120 may remain overlap with the second link member 604 (i.e. the second link member 604 may be in the retracted position relative to the second handle part 120) such that the second link member 604 together with the second handle part 120 may be moved outwards and away from the elongate bridge 130. Hence, in the intermediate extended state of the extendable controller 600, a distance apart between the first handle-body-portion 112 of the first handle part 110 and the second handle-body-portion 122 of the second handle part 120 may be between the minimum and the maximum.

According to various embodiments, the relative movement between the first link member 602 and the first handle part 110 and the relative movement between the second link member 604 and the second handle part 120 may be independently controlled. Accordingly, depending on the size of the tablet, the user may control either one or both of the first link member 602 and the second link member 604 to be moved to the extended position respectively relative to the corresponding first handle part 110 and/or the second handle part 120. Therefore, the extendable controller 600 may be operated to be used in further other intermediate extended state of the extendable controller 600.

According to various embodiments, a first movement control arrangement 611 may be operatively connected between the first link member 602 and the first handle part 110. The first movement control arrangement 611 may be configured to normally restrain the first link member 602 from moving between the retracted position and the extended position relative to the first handle part 110 when the first link member 602 is in the retracted position and the extended position respectively. Accordingly, when the first link member 602 is in the retracted position, the first movement control arrangement 611 may restrain the first link member 602 such that the first link member 602 may be prevented or prohibited to move from the retracted position to the extended position relative to the first handle part 110. Correspondingly, when the first link member 602 is in the extended position, the first movement control arrangement 611 may restrain the first link member 602 such that the first link member 602 may be prevented or prohibited to move from the extended position to the retracted position relative to the first handle part 110. According to various embodiments, the first movement control arrangement 611 may include an input interface 613 operable to release the first link member 602 from being restrained, when the first link member 602 is in the retracted position and in the extended position respectively, such that the first link member 602 may be movable between the retracted position and the extended position relative to the first handle part 110. Accordingly, when the first link member 602 is in the retracted position, the input interface 613 of the first movement control arrangement 611 may be operated to release the first link member 602 from being restrained such that the first link member 602 may be moved from the retracted position to the extended position. Correspondingly, when the first link member 602 is in the extended position, the input interface 613 of the first movement control arrangement 611 may be operated to release the first link member 602 from being restrained such that the first link member 602 may be moved from the extended position to the retracted position. According to various embodiments, the input interface 613 of the first movement control arrangement 611 may provide active control for the user to actively control whether the first link member 602 should be moved to the retracted position or the extended position relative to the first handle part 110 depending on a desired usage of the extendable controller 600. Accordingly, without receiving input from the user via the input interface 613 of the first movement control arrangement 611 to release the first link member 602 for moving between the retracted position and the extended position, the first movement control arrangement 611 may restrain or retain the first link member 602 in the retracted position as well as in the extended position, depending on whether the first link member 602 is at the retracted position or the extended position, such that the first link member 602 may be held or kept in respective position relative to the first handle part 110. Hence, without operating the input interface 613 of the first movement control arrangement 611 to intervene the first movement control arrangement 611, the first movement control arrangement 611 may normally function to restrain the first link member 602 when the first link member 602 is in any one of the retracted position and the extended position. Thus, the first movement control arrangement 611 may normally restrain the first link member 602 to any one of the retracted position and extended position relative to the first handle part 110 until the input interface 613 of the first movement control arrangement 611 is operated to release the first link member 602 for moving between the retracted position and extended position.

According to various embodiments, a second movement control arrangement 621 may be operatively connected between the second link member 604 and the second handle part 120. The second movement control arrangement 621 may be configured to normally restrain the second link member 604 from moving between the retracted position and the extended position relative to the second handle part 120 when the second link member 604 is in the retracted position and the extended position respectively. Accordingly, when the second link member 604 is in the retracted position, the second movement control arrangement 621 may restrain the second link member 604 such that the second link member 604 may be prevented or prohibited to move from the retracted position to the extended position relative to the second handle part 120. Correspondingly, when the second link member 604 is in the extended position, the second movement control arrangement 621 may restrain the second link member 604 such that the second link member 604 may be prevented or prohibited to move from the extended position to the retracted position relative to the second handle part 120. According to various embodiments, the second movement control arrangement 621 may include an input interface 623 operable to release the second link member 604 from being restrained, when the second link member 604 is in the retracted position and in the extended position respectively, such that the second link member 604 may be movable between the retracted position and the extended position relative to the second handle part 120. Accordingly, when the second link member 604 is in the retracted position, the input interface 623 of the second movement control arrangement 621 may be operated to release the second link member 604 from being restrained such that the second link member 604 may be moved from the retracted position to the extended position. Correspondingly, when the second link member 604 is in the extended position, the input interface 623 of the second movement control arrangement 621 may be operated to release the second link member 604 from being restrained such that the second link member 604 may be moved from the extended position to the retracted position. According to various embodiments, the input interface 623 of the second movement control arrangement 621 may provide active control for the user to actively control whether the second link member 604 should be moved to the retracted position or the extended position relative to the second handle part 120 depending on a desired usage of the extendable controller 600. Accordingly, without receiving input from the user via the input interface 623 of the second movement control arrangement 621 to release the second link member 604 for moving between the retracted position and the extended position, the second movement control arrangement 621 may restrain or retain the second link member 604 in the retracted position as well as in the extended position, depending on whether the second link member 604 is at the retracted position or the extended position, such that the second link member 604 may be held or kept in respective position relative to the second handle part 120. Hence, without operating the input interface 623 of the second movement control arrangement 621 to intervene the second movement control arrangement 621, the second movement control arrangement 621 may normally function to restrain the second link member 604 when the second link member 604 is in any one of the retracted position and the extended position. Thus, the second movement control arrangement 621 may normally restrain the second link member 604 to any one of the retracted position and extended position relative to the second handle part 120 until the input interface 623 of the second movement control arrangement 621 is operated to release the second link member 604 for moving between the retracted position and extended position.

According to various embodiments, the first link member 602 and the second link member 604 of the extendable controller 600 may be synchronously (or simultaneously) extended out from the elongate bridge 130 in opposite directions in a manner similar to how the first handle part 110 and the second handle part 120 are synchronously (or simultaneously) extended out from the elongate bridge 130 in opposite directions with reference to the extendable controller 100 of FIG. 1A to FIG. 2B and the extendable controller 300 of FIG. 3A to FIG. 5B. Accordingly, for sake of brevity, the manner by which the first link member 602 and the second link member 604 of the extendable controller 600 may be synchronously (or simultaneously) extended out from the elongate bridge 130 in opposite directions are not described further because relevant descriptions with regards to the first handle part 110 and the second handle part 120 being synchronously (or simultaneously) extended out from the elongate bridge 130 in opposite directions with reference to the extendable controller 100 of FIG. 1A to FIG. 2B and the extendable controller 300 of FIG. 3A to FIG. 5B may be applied to the first link member 602 and the second link member 604 of the extendable controller 600 by replacing the "first handle part 110" and the "second handle part 120" in those relevant description with the "first link member 602" and the "second link member 604" respectively.

Figure 7A:
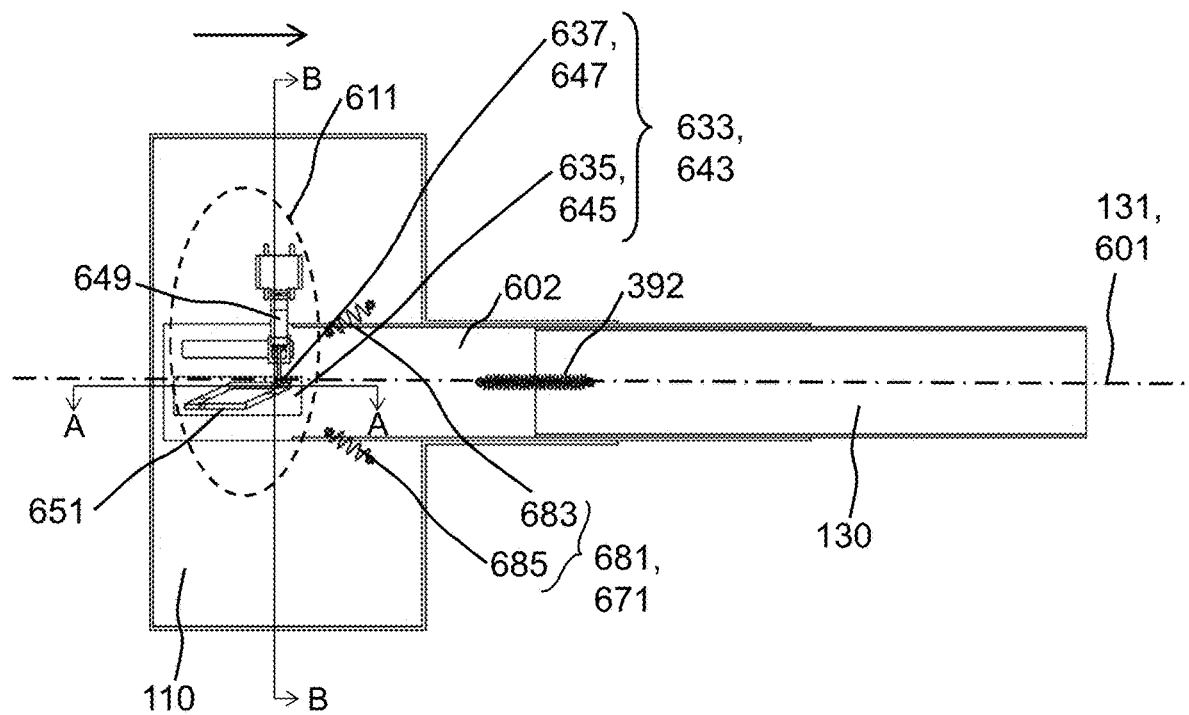
FIG. 7A shows a detailed example of a first movement control arrangement operatively connected between a first link member 602 and a first handle part 110, when the controller of FIG. 6A is in the retracted state, according to various embodiments.
Figure 7B:
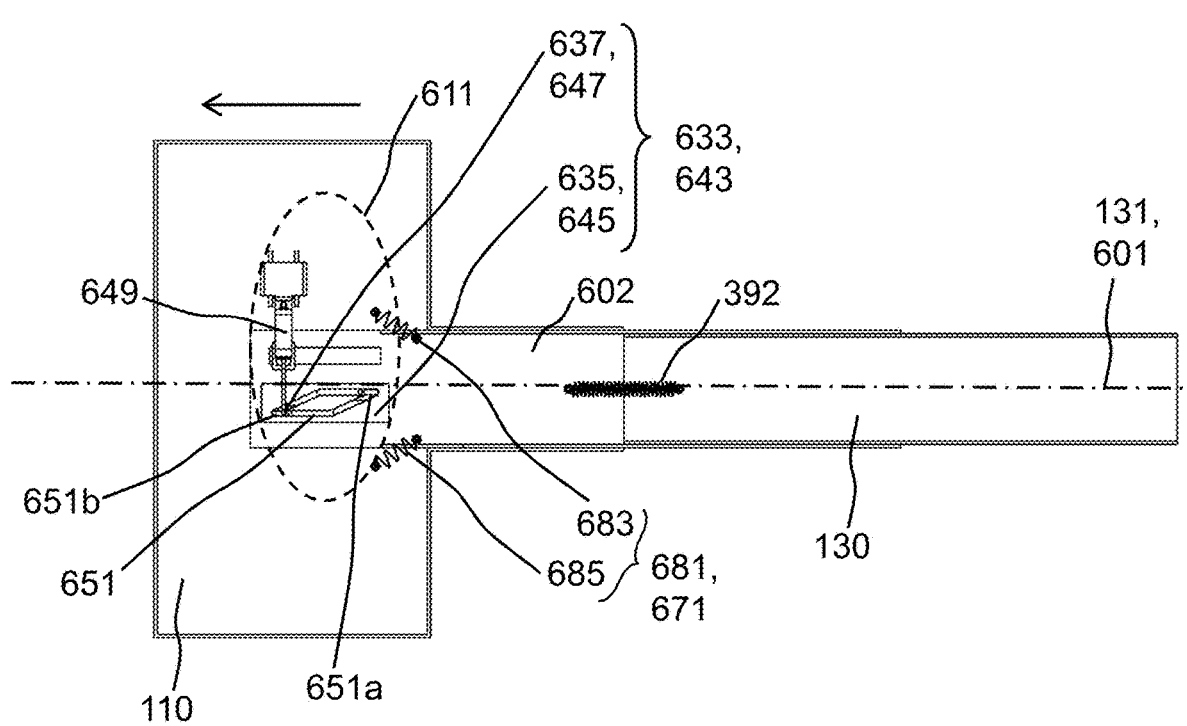
FIG. 7B shows the detailed example of the first movement control arrangement operatively connected between the first link member and the first handle part, when the first link member is extended from the first handle part, according to various embodiments.

FIG. 7A shows a detailed example of the first movement control arrangement 611 operatively connected between the first link member 602 and the first handle part 110, when the controller 600 is in the retracted state, according to various embodiments. FIG. 7B shows the detailed example of the first movement control arrangement 611 operatively connected between the first link member 602 and the first handle part 110, when the first link member 602 is extended from the first handle part 110 (i.e. the controller 600 is extended), according to various embodiments. It is understand that the following description with reference to the first movement control arrangement 611 in operative connection between the first link member 602 and the first handle part 110 is also applicable to describing the second movement control arrangement 621 being operatively connected between the second link member 604 and the second handle part 120 by replacing the term "first" with "second" accordingly. Therefore, for sake of brevity, the following descriptions are not repeated for the second movement control arrangement 621.

Referring to FIG. 7A and FIG. 7B, all other components and elements of the extendable controller 600 are removed so as to focus the illustration on how the first movement control arrangement 611 may be operatively connected between the first link member 602 and the first handle part 110. According to various embodiments, the first movement control arrangement 611 may include a movement mechanism 633 operatively connecting the first link member 602 to the first handle part 110. The movement mechanism 633 may include a first movement piece 635 associated with the first link member 602 and a second movement piece 637 associated with the first handle part 110. According to various embodiments, the first movement piece 635 and the second movement piece 637 may be configured to interact with each other such that the first movement piece 635 and the second movement piece 637 may engage with each other in a manner so as to prevent relative movement between the first link member 602 and the first handle part 110 when the first link member 602 is in the retracted position and in the extended position respectively relative to the first handle part 110. For example, when the first link member 602 is in the retracted position and in the extended position respectively relative to the first handle part 110, the first movement piece 635 and the second movement piece 637 may be in interlocking engagement, friction engagement, adhesive engagement, magnetic engagement, suction engagement, etc. such that the first movement piece 635 and the second movement piece 637 may be temporary fixed or temporary made fast to each other so as to prevent or prohibit relative movement between the first movement piece 635 and the second movement piece 637 thereby restraining the first link member 602 from moving relative to the first handle part 110. According to various embodiments, the input interface 613 of the first movement control arrangement 611 may include an intervening member 639. According to various embodiments, the input interface 613 of the first movement control arrangement 611 may be operated to move the intervening member 639 into an active disposition so as to interfere the engagement between the first movement piece 635 and the second movement piece 637 so as to break the engagement. When the engagement between the first movement piece 635 and the second movement piece 637 is broken, the first movement piece 635 and the second movement piece 637 may no longer be temporary fixed or temporary made fast to each other and, thus, may be moved relative to each other. Accordingly, without the first movement piece 635 and the second movement piece 637 being temporary fixed or temporary made fast to each other, the first link member 602 may be freed from being restrained and may be moved relative to the first handle part 110.

As shown as an example in FIG. 7A and FIG. 7B, according to various embodiments, the first movement control arrangement 611 may include a translating mechanism 643 serving as the movement mechanism 633 operatively connecting the first link member 602 to the first handle part 110. According to various embodiments, the translating cam mechanism 643 may include a cam plate 645 as the first movement piece 635 and a follower 647 as the second movement piece 637. The cam plate 645 may be associated with the first link member 602 and the follower 647 may be associated with the first handle part 110. For example, the cam plate 645 may be fixedly disposed at the first link member 602. Accordingly, the cam plate 645 may be fixedly coupled to the first link member 602 or integrally formed with the first link member 602 such that the cam plate 645 and the first link member 602 together may form a unitary structure. Hence, the cam plate 645 and the first link member 602 may be moved together as a single unit. Further, the follower 647 may be non-movable relative to the handle part 110 in a direction parallel to the extension axis 601 of the first link member 602 relative to the first handle part 110. Accordingly, the follower 647 may be restrained or restricted by the first handle part 110 such that the follower 647 may not move relative to the handle part 110 in the direction parallel to the extension axis 601 of the first link member 602. Hence, when the first link member 602 is being moved along the extension axis 601 relative to the handle part 110, the first link member 602 and the cam plate 645 may be moving relative to the follower 647.

According to various embodiments, in a three-dimensional space, the direction parallel to the extension axis 601 of the first link member 602 may be considered as a first reference direction and may be assigned as the x-axis. According to various embodiments, while the follower 647 may be non-movable relative to the handle part 110 in the first reference direction parallel to the extension axis 601 of the first link member 602, the follower 647 may be movable relative to the handle part 110 in a second reference direction perpendicular to the extension axis 601 of the first link member 602. The first reference direction and the second reference direction may lie in a coronal plane of the extendable controller 600. The coronal plane of the extendable controller 600 may be a plane that divides the extendable controller 600 into front and back. The front of the extendable controller 600 may be a part of the extendable controller 600 whereby the controls and control buttons are located. The back of the extendable controller 600 may be a part of the extendable controller 600 opposite the front of the extendable controller 600. Accordingly, the second reference direction may be assigned as the y-axis. Hence, the coronal plane, in which the first reference direction and the second reference direction lie, may be assigned as a xy-plane. According to various embodiments, the follower 647 may be further movable relative to the handle part 110 in a third reference direction perpendicular to the xy-plane, i.e. the coronal plane. The third reference direction may correspond to a thickness direction of the extendable controller 600. Accordingly, the third reference direction may be assigned as a z-axis. Hence, the follower 647 may be further moveable relative to the handle part 110 in the third reference direction perpendicular to both the first reference direction and the second reference direction.

Figure 8A:
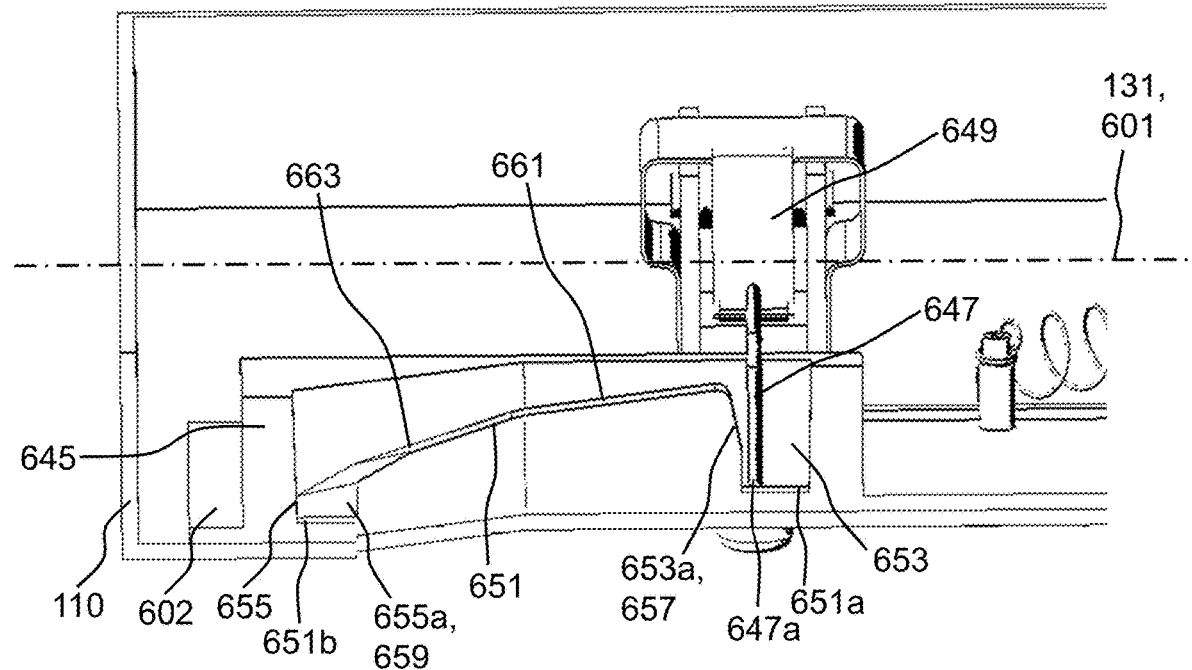
FIG. 8A shows a A-A sectional view of the first movement control arrangement of FIG. 7A according to various embodiments.

FIG. 8A shows an A-A sectional view of the first movement control arrangement 611 of FIG. 6A according to various embodiments. According to various embodiments, the cam plate 645 may include a cam track 651. The cam track 651 may define a path for the follower 647 to follow when the first link member 602 is moving relative to the first handle part 110. Accordingly, the follower 647 and the cam plate 645 may interact in a manner whereby a tip 647a of the follower 647 may be in engagement with the cam track 651 of the cam plate 645. According to various embodiments, when the first link member 602 is in the retracted position, the follower 647 may be at a first end 651a of the cam track 651 of the cam plate 645, whereby the tip 647a of the follower 647 may be in engagement with the first end 651a of the cam track 651 of the cam plate 645. On the other hand, when the first link member 602 is in the extended position, the follower 647 may be at a second end 651b of the cam track 651 of the cam plate 645 whereby the tip 647a of the follower 647 may be in engagement with the second end 651b of the cam track 651. The first end 651a of the cam track 651 and the second end 651b of the cam track 651 may be opposite to each other with respect to the extension axis 601 of the link member 602. According to various embodiments, the cam track 651 of the cam plate 645 may be in the form of a groove or a slot or a rail or a rod or a bar, and the tip 647a of the follower 647 may be correspondingly configured to interact with the groove or the slot or the rail or the rod or the bar.

As shown in the example of FIG. 8A, according to various embodiments, the cam track 651 of the cam plate 645 may be in the form of a groove. According to various embodiments, the cam track 651, in the form of the groove, may include a first pit 653 at a first end 651a of the cam track 651 and a second pit 655 at a second end 651b of the cam track 651. Each of the first pit 653 and the second pit 655 may be an indentation or a depression or a well or a notch. According to various embodiments, when the follower 647 is in engagement with the first pit 653 and the second pit 655 respectively, the follower 647 may drop into the corresponding first pit 653 or the second pit 655. Accordingly, when the cam track 651 of the cam plate 645 is in the form of the groove, the tip 647a of the follower 647 may be inserted into the first pit 653 and the second pit 655 respectively for the follower 647 to be considered being dropped in the first pit 653 and the second pit 655 respectively.

According to various embodiments, when the first link member 602 is at the retracted position, the follower 647 may be at the first end 651a of the cam track 651 of the cam plate 645. The follower 647 may be in engagement with the first end 651a of the cam track 651 such that the follower 647 may drop into the first pit 653 of the cam track 651, whereby the tip 647a of the follower 647 may be fitted or inserted into the first pit 653 of the cam track 651. With the follower 647 dropped into the first pit 653 of the cam track 651, the first link member 602 may be restrained from being moved along the extension axis 601 of the first link member 602 because the follower 647 is non-movable relative to the first handle part 110 with respect to the extension axis 601 of the first link member 602. Hence, the follower 647 being fitted or inserted into the first pit 653 of the cam track 651 may cause or result in the first link member 602 being restrained from moving relative to the first handle part 110 along the extension axis 601 of the first link member 602. According to various embodiments, when the first link member 602 is at the extended position, the follower 647 may be at the second end 651b of the cam track 651 of the cam plate 645. The follower 647 may be in engagement with the second end 651b of the cam track 651 such that the follower 647 may drop into the second pit 655 of the cam track 651, whereby the tip 647a of the follower 647 may be fitted or inserted into the second pit 655 of the cam track 651. With the follower 647 dropped into the second pit 655 of the cam track 651, the first link member 602 may be restrained from being moved along the extension axis 601 of the first link member 602 because the follower 647 is non-movable relative to the first handle part 110 with respect to the extension axis 601 of the first link member 602. Hence, the follower 647 being fitted or inserted into the second pit 655 of the cam track 651 may cause or result in the first link member 602 being restrained from moving relative to the first handle part 110 along the extension axis 601 of the first link member 602.

Figure 8B:
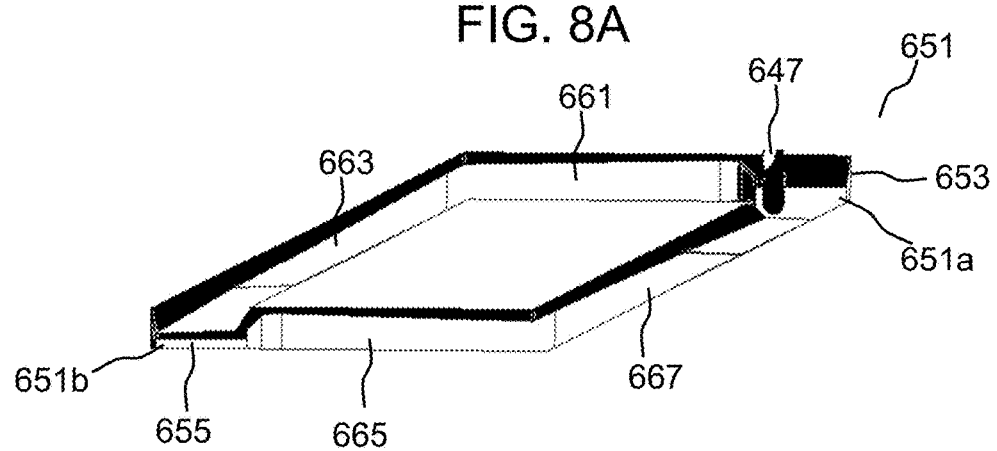
FIG. 8B shows an example of a cam track of the first movement control arrangement of FIG. 7A according to various embodiments.

According to various embodiments, the cam track 651 may be a single track extending between two points or may be a closed loop track. FIG. 8B shows an example of the cam track 651 being the closed loop track. According to various embodiments, when the cam track 651 is in the form of the closed loop track, the cam track 651 may be in a circular formation, oval formation, elliptical formation, polygonal formation, or other suitable closed circuit formation. According to various embodiments, when the cam track 651 is in the polygonal formation, the cam track 651 may include three or four or more straight sections arranged in the polygonal formation.

As shown in FIG. 8B, according to various embodiments, the cam track 651 may include the closed loop track, wherein the closed loop track may include four straight sections arranged in a rhombus formation. Accordingly, in the rhombus formation, the first end 651a of the cam track 651 and the second end 651b of the cam track 651 may be two opposite corners of the rhombus formation. Hence, the first pit 653 of the cam track 651 and the second pit 655 of the cam track 651 may be at the two opposite corners of the rhombus formation.

According to various embodiments, the cam track 651, with the rhombus formation, may include a first straight section 661 and a second straight section 663 in series between the first end 651a of the cam track 651 and the second end 651b of the cam track 651. Accordingly, the first straight section 661 and the second straight section 663 may form a first cam path extending from the first end 651a of the cam track 651 to the second end 651b of the cam track 651. Therefore, the cam track 651 may include the first straight section 661 followed by the second straight section 663 from the first pit 653 of the cam track 651 to the second pit 655 of the cam track 651.

According to various embodiments, the cam track 651 may include a cam profile having a sharp rise 657 (or steep rise) at a transition between the first pit 653 of the cam track 651 and the first straight section 661 of the cam track 651 (for example, see FIG. 8A). The sharp rise 657 in the cam profile may serve to prevent or prohibit the follower 647 to cross over from the first pit 653 to the first straight section 661 of the cam track 651 on its own. Accordingly, the sharp rise 657 at the transition between the first pit 653 of the cam track 651 and the first straight section 661 of the cam track 651 may normally retain the follower 647 at the first end 651a of the cam track 651 within the first pit 653 when the first link member 602 is at the retracted position with the follower 647 at the first end 651a of the cam track 651.

According to various embodiments, when the cam track 651 of the cam plate 645 is in the form of the groove, the cam profile may be a shape or an outline or a profile of the groove floor (or groove bed). Accordingly, the sharp rise 657 in the cam profile may be an abrupt change in depth of the groove caused by the first pit 653 at the first end 651a of the cam track 651 at the transition between the first pit 653 of the cam track 651 and the first straight section 661 of the cam track 651. According to various embodiments, the sharp rise 657 of the cam profile at the transition between the first pit 653 of the cam track 651 and the first straight section 661 of the cam track 651 may be in the form of a wall or a steep surface 653a extending along a corresponding side of the first pit 653. Accordingly, the wall or the steep surface 653a of the first pit 653 at the side corresponding to the transition between the first pit 653 of the cam track 651 and the first straight section 661 of the cam track 651 may define the sharp rise 657 in the cam profile of the cam track 651. According to various embodiments, the wall or the steep surface 653a of the first pit 653 of the cam track 651 may serve as a stopper blocking the follower 647 from crossing over from the first pit 653 of the cam track 651 to the first straight section 661 of the cam track 651 while the follower 647 is in the first pit 653 of the cam track 651 in order to restrain the first link member 602 when the first link member 602 is in the retracted position. According to various embodiments, the wall or the steep surface 653a of the first pit 653 of the cam track 651 may have a high gradient or an almost vertical slope or pitch such that the follower 647 may not be capable of crossing over the transition between the first pit 653 of the cam track 651 and the first straight section 661 of the cam track 651 normally, and may be impeded or halt or obstructed by the wall or the steep surface 653a of the first pit 653 of the cam track 651. With the follower 647 being blocked or obstructed or impeded, the follower 647 may be restrained or held in place within the first pit 653 of the cam track 651 such that the first link member 602 may be restrained when the first link member 602 is in the retracted position.

Figure 9A:
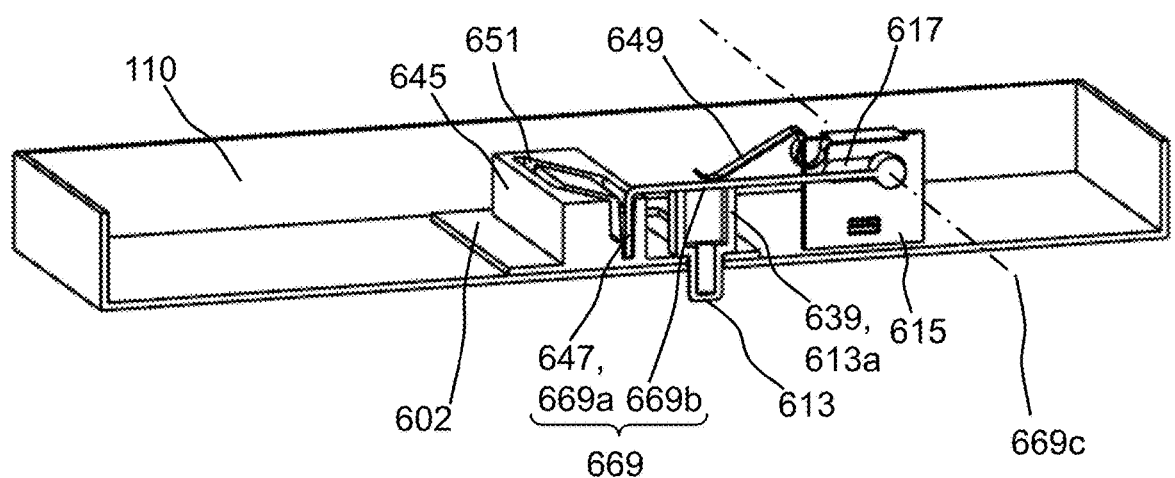
FIG. 9A and FIG. 9B show B-B sectional view of the first movement control arrangement of FIG. 7A according to various embodiments.
Figure 9B:
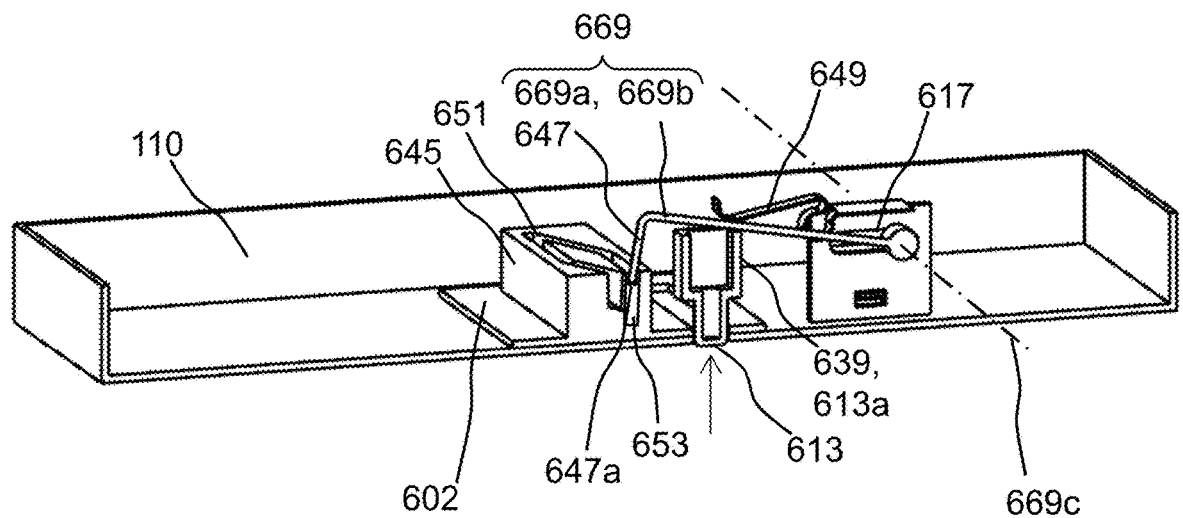

FIG. 9A and FIG. 9B show B-B sectional view of the first movement control arrangement 611 according to various embodiments. According to various embodiments, the input interface 613 of the first movement control arrangement 611 may be operable to lift the follower 647. Accordingly, the input interface 613 of the first movement control arrangement 611 may be operated to move the follower 647 in the thickness direction (i.e. the z-axis) of the extendable controller 600 for lifting the follower 647 relative to the cam track 651 of the cam plate 645. According to various embodiments, when the follower 647 is lifted from the cam track 651 of the cam plate 645, the tip 647a of the follower 647 may be raised upwards from the groove floor (or groove bed) of the groove forming the cam track 651. Hence, the follower 647 may be lifted off the cam track 651 of the cam plate 645 by operating the input interface 613 of the first movement control arrangement 611 to interfere the interaction between the follower 647 and the cam track 651 of the cam plate 645.

According to various embodiments, the input interface 613 of the first movement control arrangement 611 may be operable to lift the follower 647 over the sharp rise 657 at the transition between the first pit 653 of the cam track 651 and the first straight section 661 of the cam track 651 such that the follower 647 may cross over from the first pit 653 of the cam track 651 to the first straight section 661 of the cam track 651. Accordingly, the input interface 613 of the first movement control arrangement 611 may be operated to lift the follower 647 to a height or a level higher than the sharp rise 657 at the transition between the first pit 653 of the cam track 651 and the first straight section 661 of the cam track 651 such that the follower 647 may be above the first straight section 661 of the cam track 651 (or above the sharp rise 657 at the transition). Hence, the tip 647a of the follower 647 may be raised upwards from a bottom of the first pit 653 of the cam track 651 by the input interface 613 of the first movement control arrangement 611. With the follower 647 lifted higher than the sharp rise 657 at the transition between the first pit 653 of the cam track 651 and the first straight section 661 of the cam track 651, the follower 647 may then cross over from the first pit 653 of the cam track 651 to the first straight section 661 of the cam track 651. After the follower 647 is lifted over by the input interface 613 of the first movement control arrangement 611, the cam plate 645 may move relative to the follower 647 with the follower 647 following the first straight section 661 and the second straight section 663 of the cam track 651 of the cam plate 645 (e.g. from the first end 651a of the cam track 651 towards the second end 651b of the cam track 651). Thus, lifting the follower 647 over the sharp rise 657 to cross over from the first pit 653 of the cam track 651 to the first straight section 661 of the cam track 651, the follower 647 may no longer be blocked or obstructed or impeded by the wall or the steep surface 653a of the first pit 653 of the cam track 651. Hence, the follower 647 may be freed from being restrained or held in place within the first pit 653 of the cam track 651. Accordingly, the first link member 602 may be released from being restrained in the retracted position such that the first link member 602 may be movable relative to the handle part 110 (e.g. from the retracted position to the extended position) with the follower 647 following along the first straight section 661 and the second straight section 663 of the cam track 651.

Referring back to FIG. 8A, according to various embodiments, the cam profile of the cam track 651 may further include a continuous gradual return (or fall or decline) along the first straight section 661 of the cam track 651 and the second straight section 663 of the cam track 651 in sequence towards the second pit 655. Accordingly, the cam profile along the first straight section 661 and the second straight section 663 of the cam track 651 from the first end 651a of the cam track 651 to the second end 651b of the cam track 651 may be in the form of a gradual downward slope extending from the sharp rise 657 at the first end 651a of the cam track 651 (i.e. the transition between the first pit 653 of the cam track 651 and the first straight section 661 of the cam track 651) towards the second pit 655 at the second end 651b of the cam track 651. Hence, the second straight section 663 of the cam track 651 may follow after the first straight section 661 of the cam track 651, and the first straight section 661 of the cam track 651 and the second straight section 663 of the cam track 651 may together form a continuous declining slope from the sharp rise 657 at the first end 651a of the cam track 651 towards the second pit 655 at the second end 651b of the cam track 651.

According to various embodiments, when the first link member 602 is moving relative to the handle part 110 (e.g. from the retracted position to the extended position) with the follower 647 following along the first straight section 661 and the second straight section 663 of the cam track 651, the tip 647a of the follower 647 may be sliding along the groove floor along the first straight section 661 and the second straight section 663 of the cam track 651. Accordingly, the tip 647a of the follower 647 may be kept in contact with the groove floor of the first straight section 661 and the second straight section 663 of the cam track 651 as the first link member 602 is moved relative to the handle part 110 (e.g. from the retracted position to the extended position).

Referring to FIG. 9A and FIG. 9B, according to various embodiments, the first movement control arrangement 611 may include a follower-biasing-member 649. The follower-biasing-member 649 may be operatively connected between the first handle part 110 and the follower 647 to exert a biasing force on the follower 647 so as to urge the tip 647a of the follower 647 towards the cam track 651. Accordingly, the follower-biasing-member 649 may exert the biasing force to keep the tip 647a of the follower 647 in contact with the groove floor of the cam track 651. According to various embodiments, when the follower 647 is in the first pit 653, the follower-biasing-member 649 may exert the biasing force to keep the follower 647 within the first pit 653. According to various embodiments, when the follower 647 is following the first straight section 661 and the second straight section 663 of the cam track 651, the follower-biasing-member 649 may exert the biasing force to keep the tip 647a of the follower 647 in contact with the groove floor of the first straight section 661 and the second straight section 663 of the cam track 651. According to various embodiments, the follower-biasing-member 649 may include a spring, for example a leaf spring or a torsion spring etc. The spring may be coupled to the first handle part 611. When the spring is a leaf spring or a torsion spring, a leg of the leaf spring of the torsion spring may be in engagement with the follower 647 to exert the biasing force on the follower 647.

As also shown in FIG. 9A and FIG. 9B, according to various embodiments, the follower 647 may be part of an L-shaped structure 669. The L-shaped structure 669 may include an insertion portion 669a serving as the follower 647 and an arm portion 669b. The insertion portion 669a of the L-shaped structure 669 (i.e. the follower 647) may be in engagement with the cam track 651 of the cam plate 645. Accordingly, the insertion portion 669a of the L-shaped structure 669 (i.e. the follower 647) may be inserted or fitted into the groove forming the cam track 651 of the cam plate 645. Hence, a free-end of insertion portion 669a of the L-shaped structure 669 (i.e. the follower 647) may be the tip 647a of the follower 647 in contact with the groove floor of the cam track 651 of the cam plate 645. When the follower 647 is at the first end 651a of the cam track 651, the insertion portion 669a of the L-shaped structure 669 (i.e. the follower 647) may be in the first pit 653 of the cam track 651 whereby the insertion portion 669a of the L-shaped structure 669 (i.e. the follower 647) may abut against the sharp rise 657 so as to be blocked or obstructed or impeded by the sharp rise 657 of the cam track 651.

According to various embodiments, an end of the arm portion 669b of the L-shaped structure 669 opposite to the insertion portion 669a of the L-shaped structure 669 (i.e. the follower 647) may be pivotable with respect to the first handle part 110. A pivot axis 669c of the end of the arm portion 669b of the L-shaped structure 669 may be parallel to the extension axis 601 of the first link member 602. Accordingly, the L-shaped structure 669 may be pivoted about the pivot axis 669c for lifting the tip 647a of the follower 647 (i.e. the free end of the insertion portion 669a of the L-shaped structure 669) away from the cam track 651.

According to various embodiments, the first handle part 110 may include a follower support structure 615. The follower 647 may be movably coupled to the follower support structure 615 of the first handle part 110. For example, the end of the arm portion 669b of the L-shaped structure 669 may be movably coupled to the follower support structure 615 of the first handle part 110.

According to various embodiments, the follower support structure 615 may include a slot 617 extending in a direction (i.e. y-axis) perpendicular to the extension axis 601 of the first link member 602 (i.e. x-axis) and the thickness direction of the extendable controller 600 (i.e. z-axis). Accordingly, the end of the arm portion 669b of the L-shaped structure 669 may be in engagement with the slot 617 of the follower support structure 615 so as to be pivotable and slidable relative to the slot 617 of the follower support structure 615. As shown in FIG. 8B, the first straight section 661 and the second straight section 663 of the cam track 651 may be two adjacent sides of the rhombus formation. Accordingly, the first straight section 661 and the second straight section 663 may be at an angle or may form a bend when view in a plan view (i.e. xy-plane). Hence, referring back to FIG. 9A and FIG. 9B, with the L-shaped structure 669 slidable relative to the slot 617 of the follower support structure 615, the insertion portion 669a of the L-shaped structure 669 (i.e. the follower 647) may follow the cam track 651 along the first straight section 661 and the second straight section 663 of the cam track 651 (even though the first straight section 661 and the second straight section 663 may be at an angle or may form a bend) by sliding the end of the arm portion 669b of the L-shaped structure 669 along the direction (i.e. y-axis) perpendicular to both the extension axis 601 of the first link member 602 (i.e. x-axis) and the thickness direction of the extendable controller 600 (i.e. z-axis). Further, with the end of the arm portion 669b of the L-shaped structure 669 pivotable relative to the slot 617 of the follower support structure 615, the arm portion 669b of the L-shaped structure 669 may be pivoted upwards so as to lift or raise the insertion portion 669a of the L-shaped structure 669 (i.e. the follower 647) such that the tip 647a of the follower 647 may be lifted to cross over the sharp rise 657 of the cam track 651 at the transition between the first pit 653 of the cam track 651 and the first straight section 661 of the cam track 651. Furthermore, the follower-biasing-member 649 may exert the biasing force on the arm portion 669b of the L-shaped structure 669 to urge the arm portion 669b of the L-shaped structure 669 to pivot downwards so as to keep the tip 647a of the follower 647 in contact with the groove floor of the cam track 651. For example, when the follower-biasing-member 649 is the leaf spring or the torsion spring, the leaf spring or the torsion spring may be coupled to the follower support structure 615 and the leg of the leaf spring or the torsion spring may be in engagement with the arm portion 669b of the L-shaped structure 669 to exert the biasing force to urge the arm portion 669b of the L-shaped structure 669 to pivot downwards.

According to various embodiments, the input interface 613 of the first movement control arrangement 611 may include a pusher 613a. The pusher 613a may serve as the intervening member 639 to interfere the engagement between the follower 647 and the cam track 645. According to various embodiments, the pusher 613a may be disposed to engage the follower 647 in a manner such that the input interface 613 may be operable to drive the pusher 613a to apply a force on the follower 647 to counteract the biasing force of the follower-biasing-member 649 so as to lift the tip 647a of the follower 647 away from the cam track 651. Accordingly, the pusher 613a of the input interface 613 and the follower-biasing-member 649 may work in a counter-acting manner, wherein the follower-biasing-member 649 may bias the follower 647 against being lifted from the cam track 651 while the pusher 613a of the input interface 613 may be driven to push the follower 647 to counteract the biasing force for lifting the follower 647 away from the cam track 651. According to various embodiments, as shown, the pusher 613a of the input interface 613 may be in engagement with the arm portion 669b of the L-shaped structure 669. According to various embodiments, the input interface 613 of the first movement control arrangement 611 may be in the form of a button, whereby pushing the button may drive the pusher 613a of the input interface 613 to push the follower 647 to overcome the biasing force of the follower-biasing-member 649 so as to lift the follower 647 (as well as the tip 647a of the follower 647) away from the cam track 651.

Referring back to FIG. 8A, the cam profile of the cam track 651 may include a sharp drop 659 (or steep fall) at a transition between the second straight section 663 and the second pit 655. As the follower 647 follows along the first straight section 661 and the second straight section 663 of the cam track 651 when the first link member 602 is moved relative to the first handle part 110 (e.g. from the retracted position to the extended position), the follower 647 may cross over the transition between the second straight section 663 and the second pit 655 and drop into the second pit 655 when the follower 647 reaches the second end 651b of the cam track 651. Hence, when the follower 647 cross over the sharp drop 659 to the second pit 655, the follower 647 may drop into the second pit 655. According to various embodiments, the sharp drop 659 in the cam profile may serve to prevent or prohibit the follower 647 to cross back from the second pit 655 to the second straight section 663 after the follower 647 reaches the second end 651b of the cam track 651 and drops into the second pit 655 of the cam track 651. Accordingly, the sharp drop 659 at the transition between the second straight section 663 of the cam track 651 and the second pit 655 of the cam track 651 may normally retain the follower 647 at the second end 651b of the cam track 651 within the second pit 655 when the first link member 602 is at the extended position with the follower 647 at the second end 651b of the cam track 651.

According to various embodiments, when the cam track 651 of the cam plate 645 is in the form of the groove, the sharp drop 659 in the cam profile may be an abrupt change in depth of the groove caused by the second pit 655 at the second end 651b of the cam track 651 at the transition between the second straight section 663 of the cam track 651 the second pit 655 of the cam track 651. According to various embodiments, the sharp drop 659 of the cam profile at the transition between the second straight section 663 of the cam track 651 the second pit 655 of the cam track 651 may be in the form of a wall or a steep surface 655a extending along a corresponding side of the second pit 655. Accordingly, the wall or the steep surface 655a of the second pit 655 at the side corresponding to the transition between the second straight section 663 of the cam track 651 the second pit 655 of the cam track 651 may define the sharp drop 659 in the cam profile of the cam track 651. According to various embodiments, the wall or the steep surface 655a of the second pit 655 of the cam track 651 may serve as a stopper blocking the follower 647 from crossing back from the second pit 655 of the cam track 651 to the second straight section 663 of the cam track 651 while the follower 647 is in the second pit 655 of the cam track 651 in order to restrain the first link member 602 when the first link member 602 is in the extended position. According to various embodiments, the wall or the steep surface 655a of the second pit 655 of the cam track 651 may have a high gradient or an almost vertical slope or pitch such that the follower 647 may not be capable of crossing back the transition between the second straight section 663 of the cam track 651 the second pit 655 of the cam track 651 normally, and may be impeded or halt or obstructed by the wall or the steep surface 655a of the second pit 655 of the cam track 651. With the follower 647 being blocked or obstructed or impeded, the follower 647 may be restrained or held in place within the second pit 655 of the cam track 651 such that the first link member 602 may be restrained when the first link member 602 is in the extended position.

Referring to FIG. 8B, according to various embodiments, the cam track 651, with the rhombus formation, may include a third straight section 665 and a fourth straight section 667 in series between the second end 651b of the cam track 651 and the first end 651a of the cam track 651. Accordingly, the third straight section 665 and the fourth straight section 667 may form a second cam path extending from the second end 651b of the cam track 651 to the first end 651a of the cam track 651. Therefore, the cam track 651 may include the third straight section 665 followed by the fourth straight section 667 from the second pit 655 of the cam track 651 to the first pit 653 of the cam track 651. The first cam path and the second cam path may be two separate and distinct cam paths interconnecting the first end 651a of the cam track 651 to the second end 651b of the cam track 651 (or the first pit 653 of the cam track 651 and the second pit 655 of the cam track 651).

According to various embodiments, the cam profile of the cam track 651 may include a further (or second) sharp rise (or steep rise) at a transition between the second pit 655 of the cam track 651 and the third straight section 665 of the cam track 651 (similar to the sharp rise 657 between the first pit 653 of the cam track 651 and the first straight section 661 of the cam track 651). The further sharp rise in the cam profile may serve to prevent or prohibit the follower 647 to cross over from the second pit 655 to the third straight section 665 of the cam track 651 on its own. Accordingly, the further sharp rise at the transition between the second pit 655 of the cam track 651 and the third straight section 665 of the cam track 651 may normally retain the follower 647 at the second end 651b of the cam track 651 within the second pit 655 when the first link member 602 is at the extended position with the follower 647 at the second end 651b of the cam track 651.

According to various embodiments, when the cam track 651 of the cam plate 645 is in the form of the groove, the further sharp rise in the cam profile may be an abrupt change in depth of the groove caused by the second pit 655 at the second end 651b of the cam track 651 at the transition between the second pit 655 of the cam track 651 and the third straight section 665 of the cam track 651. According to various embodiments, the further sharp rise of the cam profile at the transition between the second pit 655 of the cam track 651 and the third straight section 665 of the cam track 651 may be in the form of a wall or a steep surface extending along a corresponding side of the second pit 655. Accordingly, the wall or the steep surface of the second pit 655 at the side corresponding to the transition between the second pit 655 of the cam track 651 and the third straight section 665 of the cam track 651 may define the further sharp rise in the cam profile of the cam track 651. According to various embodiments, the wall or the steep surface of the second pit 655 of the cam track 651 may serve as a stopper blocking the follower 647 from crossing over from the second pit 655 of the cam track 651 to the third straight section 665 of the cam track 651 while the follower 647 is in the second pit 655 of the cam track 651 in order to restrain the first link member 602 when the first link member 602 is in the extended position. According to various embodiments, the wall or the steep surface of the second pit 655 of the cam track 651 may have a high gradient or an almost vertical slope or pitch such that the follower 647 may not be capable of crossing over the transition between the second pit 655 of the cam track 651 and the third straight section 665 of the cam track 651 normally, and may be impeded or halt or obstructed by the wall or the steep surface of the second pit 655 of the cam track 651. With the follower 647 being blocked or obstructed or impeded, the follower 647 may be restrained or held in place within the second pit 655 of the cam track 651 such that the first link member 602 may be restrained when the first link member 602 is in the extended position.

According to various embodiments, the input interface 613 of the first movement control arrangement 611 may be operable to lift the follower 647 over the further sharp rise at the transition between the second pit 655 of the cam track 651 and the third straight section 665 of the cam track 651 such that the follower 647 may cross over from the second pit 655 of the cam track 651 to the third straight section 665 of the cam track 651. Accordingly, the input interface 613 of the first movement control arrangement 611 may be operated to lift the follower 647 to a height or a level higher than the further sharp rise at the transition between the second pit 655 of the cam track 651 and the third straight section 665 of the cam track 651 such that the follower 647 may be above the third straight section 665 of the cam track 651 (or above the further sharp rise at the transition). Hence, the tip 647a of the follower 647 may be raised upwards from a bottom of the second pit 655 of the cam track 651 by the input interface 613 of the first movement control arrangement 611. With the follower 647 lifted higher than the further sharp rise at the transition between the second pit 655 of the cam track 651 and the third straight section 665 of the cam track 651, the follower 647 may then cross over from the second pit 655 of the cam track 651 to the third straight section 665 of the cam track 651. After the follower 647 is lifted over by the input interface 613 of the first movement control arrangement 611, the cam plate 645 may move relative to the follower 647 with the follower 647 following the third straight section 665 and the fourth straight section 667 of the cam track 651 of the cam plate 645 (e.g. from the second end 651b of the cam track 651 towards the first end 651a of the cam track 651). Thus, lifting the follower 647 over the further sharp rise to cross over from the second pit 655 of the cam track 651 to the third straight section 665 of the cam track 651, the follower 647 may no longer be blocked or obstructed or impeded by the wall or the steep surface of the second pit 655 of the cam track 651. Hence, the follower 647 may be freed from being restrained or held in place within the second pit 655 of the cam track 651. Accordingly, the first link member 602 may be released from being restrained in the extended position such that the first link member 602 may be movable relative to the handle part 110 (e.g. from the extended position to the retracted position) with the follower 647 following along the third straight section 665 and the fourth straight section 667 of the cam track 651.

Referring back to FIG. 8A, according to various embodiments, the cam profile of the cam track 651 may further include a continuous gradual return (or fall or decline) along the third straight section 665 of the cam track 651 and the fourth straight section 667 of the cam track 651 in sequence towards the first pit 653. Accordingly, the cam profile along the third straight section 665 and the fourth straight section 667 of the cam track 651 from the second end 651b of the cam track 651 to the first end 651a of the cam track 651 may (similar to that along the first straight section 661 and the second straight section 663 of the cam track 651) be in the form of a gradual downward slope extending from the further sharp rise at the second end 651b of the cam track 651 (i.e. the transition between the second pit 655 of the cam track 651 and the third straight section 665 of the cam track 651) towards the first pit 653 at the first end 651a of the cam track 651. Hence, the fourth straight section 667 of the cam track 651 may follow after the third straight section 665 of the cam track 651, and the third straight section 665 of the cam track 651 and the fourth straight section 667 of the cam track 651 may together form a continuous declining slope from the further sharp rise at the second end 651b of the cam track 651 towards the first pit 653 at the first end 651a of the cam track 651.

According to various embodiments, when the first link member 602 is moving relative to the handle part 110 (e.g. from the extended position to the retracted position) with the follower 647 following along the third straight section 665 and the fourth straight section 667 of the cam track 651, the tip 647a of the follower 647 may be sliding along the groove floor along the third straight section 665 and the fourth straight section 667 of the cam track 651. Accordingly, the tip 647a of the follower 647 may be kept in contact with the groove floor of the third straight section 665 and the fourth straight section 667 of the cam track 651 as the first link member 602 is moved relative to the handle part 110 (e.g. from the extended position to the retracted position).

According to various embodiments, when the follower 647 is in the form of the insertion portion 669a of the L-shaped structure 669, the insertion portion 669a of the L-shaped structure 669 (i.e. the follower 647) may be in the second pit 655 of the cam track 651 whereby the insertion portion 669a of the L-shaped structure 669 (i.e. the follower 647) may abut against the sharp rise 657 so as to be blocked or obstructed or impeded by the sharp rise 657 of the cam track 651 when the follower 647 is at the second end 651b of the cam track 651.

As shown in FIG. 8B, the third straight section 665 and the fourth straight section 667 of the cam track 651 may be two corresponding adjacent sides of the rhombus formation. Accordingly, the third straight section 665 and the fourth straight section 667 may be at an angle or may form a bend. According to various embodiments, when the end of the arm portion 669b of the L-shaped structure 669 is in engagement with the slot 617 of the follower support structure 615 so as to be pivotable and slidable relative to the slot 617 of the follower support structure 615, the insertion portion 669a of the L-shaped structure 669 (i.e. the follower 647) may be capable of following the cam track 651 along the third straight section 665 and the fourth straight section 667 of the cam track 651 (even though the third straight section 665 and the fourth straight section 667 may be at an angle or may form a bend) by sliding the L-shaped structure 669 along the direction (i.e. y-axis) perpendicular to the extension axis 601 of the first link member 602 (i.e. x-axis) and the thickness direction of the extendable controller 600 (i.e. z-axis).

According to various embodiments, the follower-biasing-member 649 may exert the biasing force to keep the follower 647 within the second pit 655 when the follower 647 is at the second end 651b of the cam track 651. Further, the follower-biasing-member 649 may exert the biasing force to keep the tip 647a of the follower 647 in contact with the groove floor of the cam track 651 along the third straight section 665 and the fourth straight section 667 of the cam track 651 when the first link member 602 is moving relative to the first handle part 110 (e.g. from the second end 651b of the cam track 651 towards the first end 651a of the cam track 651). According to various embodiments, the input interface 613 of the first movement control arrangement 611 may be operated to drive the pusher 613a of the input interface 613 to apply a force on the follower 647 to counteract the biasing force of the follower-biasing-member 649 so as to lift the tip 647a of the follower 647 away from the cam track 651 for crossing over the further sharp rise at the transition between the second pit 655 of the cam track 651 and the third straight section 665 of the cam track 651.

Referring back to FIG. 8A, the cam profile of the cam track 651 may include a further (or second) sharp drop 659 at a transition between the fourth straight section 667 and the first pit 653. As the follower 647 follows along the third straight section 665 and the fourth straight section 667 of the cam track 651 when the first link member 602 is moved relative to the first handle part 110 (e.g. from the extended position to the retracted position), the follower 647 may cross over the transition between the fourth straight section 667 and the first pit 653 and drop into the first pit 653 when the follower 647 reaches the first end 651a of the cam track 651. Hence, when the follower 647 cross over the further sharp drop to the first pit 653, the follower 647 may drop into the first pit 653. According to various embodiments, the further sharp drop in the cam profile may serve to prevent or prohibit the follower 647 to cross back from the first pit 653 to the fourth straight section 667 after the follower 647 reaches the first end 651a of the cam track 651 and drops into the first pit 653 of the cam track 651. Accordingly, the further sharp drop at the transition between the fourth straight section 667 of the cam track 651 and the first pit 653 of the cam track 651 may normally retain the follower 647 at the first end 651a of the cam track 651 within the first pit 653 when the first link member 602 is at the retracted position with the follower 647 at the first end 651a of the cam track 651.

According to various embodiments, when the cam track 651 of the cam plate 645 is in the form of the groove, the further sharp drop in the cam profile may be an abrupt change in depth of the groove caused by the first pit 653 at the first end 651a of the cam track 651 at the transition between the fourth straight section 667 of the cam track 651 the first pit 653 of the cam track 651. According to various embodiments, the further sharp drop of the cam profile at the transition between the fourth straight section 667 of the cam track 651 the first pit 653 of the cam track 651 may be in the form of a wall or a steep surface extending along a corresponding side of the first pit 653. Accordingly, the wall or the steep surface of the first pit 653 at the side corresponding to the transition between the fourth straight section 667 of the cam track 651 the first pit 653 of the cam track 651 may define the further sharp drop in the cam profile of the cam track 651. According to various embodiments, the wall or the steep surface of the first pit 653 of the cam track 651 may serve as a stopper blocking the follower 647 from crossing back from the first pit 653 of the cam track 651 to the fourth straight section 667 of the cam track 651 while the follower 647 is in the first pit 653 of the cam track 651 in order to restrain the first link member 602 when the first link member 602 is in the retracted position. According to various embodiments, the wall or the steep surface of the first pit 653 of the cam track 651 may have a high gradient or an almost vertical slope or pitch such that the follower 647 may not be capable of crossing back the transition between the fourth straight section 667 of the cam track 651 the first pit 653 of the cam track 651 normally, and may be impeded or halt or obstructed by the wall or the steep surface of the first pit 653 of the cam track 651. With the follower 647 being blocked or obstructed or impeded, the follower 647 may be restrained or held in place within the first pit 655 of the cam track 651 such that the first link member 602 may be restrained when the first link member 602 is in the retracted position.

Referring back to FIG. 7A and FIG. 7B, according to various embodiments, the extendable controller 600 may further include a motion-assistance arrangement 671. The motion-assistance arrangement 671 may be operatively connected between the first link member 602 and the first handle part 110 to actuate the first link member 602 so as to automate movement of the first link member 602 relative to the first handle part 110 between the retracted position and the extended position when the input interface 613 is being operated to release the first link member 602 from being restrained. Accordingly, the motion-assistance arrangement 671 may be configured to propel or drive the first link member 602 for moving relative to the first handle part 110 when the first link member 602 is unrestrained (e.g. the follower 647 is being lifted out of the first pit 653 of the cam plate 645 or the second pit 655 of the cam plate 645 respectively). According to various embodiments, the motion-assistance arrangement 671 may automatically move the first link member 602 relative to the first handle part 110 from the retracted position to the extended position when the first link member 602 is released from being restrained in the retracted position (e.g. the follower 647 is lifted to cross over the sharp rise 657 at the transition between the first pit 653 of the cam track 651 of cam plate 645 and the first straight section 661 of the cam track 651 of the cam plate 645). According to various embodiments, the motion-assistance arrangement 671 may automatically move the first link member 602 relative to the first handle part 110 from the extended position to the retracted position when the first link member is released from being restrained in the extended position (e.g. the follower 647 is lifted to cross over the further sharp rise at the transition between the second pit 655 of the cam track 651 of the cam plate 645 and the third straight section 665 of the cam track 651 of the cam plate 645).

According to various embodiments, the motion-assistance arrangement 671 may possess a potential energy when the first link member 602 is restrained in the retracted position and the extended position respectively. Accordingly, upon release of the first link member from being restrained in the retracted position and the extended position respectively, the motion-assistance arrangement 671 may convert the potential energy into kinetic energy for moving the first link member 602 relative to the first handle part 110. According to various embodiments, the motion-assistance arrangement 671 may be configured to utilize elastic potential energy, electromagnetic potential energy, gravitational potential energy, etc. for converting into kinetic energy. Accordingly, the motion-assistance arrangement 671 may include sub-arrangement that is capable of storing such potential energy and to convert such potential energy to kinetic energy for moving the first link member 602 relative to the first handle part 110.

As an example, according to various embodiments, the motion-assistance arrangement 671 may include a link-member-biasing sub-arrangement 681. The link-member-biasing sub-arrangement 681 may be capable of storing elastic potential energy and converting the elastic potential energy to kinetic energy for moving the first link member 602 relative to the first handle part 110. According to various embodiments, link-member-biasing sub-arrangement 681 may be connected between the first handle part 110 and the first link member 602. Accordingly, relative movement between the first link member 602 and the first handle part 110 may stretch or compress link-member-biasing sub-arrangement 681 to cause elastic potential energy to be stored in the link-member-biasing sub-arrangement 681 when the first link member 602 is restrained at the retracted position and the extended position respectively. Hence, when the first link member 602 is being released from restrained from the retracted position and the extended position respectively, the link-member-biasing sub-arrangement 681 may convert the elastic potential energy to kinetic energy for moving the first link member 602 relative to the first handle part 110 between the retracted position and the extended position.

Referring to FIG. 7A, according to various embodiments, when the first link member 602 is in the retracted position, the link-member-biasing sub-arrangement 681 may apply a biasing force (as a result of the stored elastic potential energy) to urge the first link member 602 to move relative to the first handle part 110 from the retracted position towards the extended position. When the first link member 602 is being restrained in the retracted position, the biasing force of the link-member-biasing sub-arrangement 681 may cause the follower 647 to abut against the wall or the steep surface 653a of the first pit 653 of the cam track 651 defining the sharp rise 657 at the transition between the first pit 653 of the cam track 651 and the first straight section 661 of the cam track 651. However, when the follower 647 is lifted by operating the input interface 613 such that the follower 647 cross over from the first pit 653 of the cam track 651 to the first straight section 661 of the cam track 651, the biasing force of the link-member-biasing sub-arrangement 681 may then result in the movement of the first link member 602 relative to the first handle part 110 from the retracted position towards the extended position with the cam plate 645 sliding relative the follower 647 as the follower 647 follows the first straight section 661 of the cam track 651 and the second straight section 663 of the cam track 651.

As shown, according to various embodiments, the link-member-biasing sub-arrangement 681 may include a pair of coil springs 683, 685 disposed on opposite sides of the first link member 602 across the extension axis 601. Accordingly, the pair of coil springs 683, 685 may be respectively disposed at two opposite longitudinal sides of the first link member 602. According to various embodiments, a first end of each coil spring 683, 685 may be coupled to the first link member 602 and a second end of each coil spring 683, 685 may be coupled to the first handle part 110. Hence, each coil spring 683, 685 may be interconnecting a corresponding side of the first link member 602 and the first handle part 110.

According to various embodiments, the pair of coil springs 683, 685 may be disposed in a symmetrical manner with the extension axis 601 being the axis of symmetry. Accordingly, the pair of coil springs 683, 685 may be respectively stretched or compressed in a similar manner when the first link member 602 moves relatively to the first handle part 110 along the extension axis 601. Hence, the pair of coil springs 683, 685 may behave in a coordinated and concerted manner to apply the biasing force and to move the first link member 602 relative to the first handle part 110 along the extension axis 601.

According to various embodiments, when the first link member 602 is in the retracted position, each coil spring 683, 685 may be in tension and may be oriented to form an acute angle with respect to the extension axis 601. Accordingly, each coil spring 683, 685 may be stretched and oriented to angle towards the extension axis 601 in a direction of retraction along the extension axis 601. Thus, the second end of each coil spring 683, 685 may be forward of the first end of each coil spring 683, 685 with respect to a direction of extension along the extension axis 601.

Referring to FIG. 7B, according to various embodiments, when the first link member 602 is in the extended position, the link-member-biasing sub-arrangement 681 may apply a biasing force (as a result of the stored elastic potential energy) to urge the first link member 602 to move relative to the first handle part 110 from the extended position towards the retracted position. When the first link member 602 is being restrained in the extended position, the biasing force of the link-member-biasing sub-arrangement 681 may cause the follower 647 to abut against the wall or the steep surface of the second pit 655 of the cam track 651 defining the further sharp rise at the transition between the second pit 655 of the cam track 651 and the third straight section 665 of the cam track 651. However, when the follower 647 is lifted by operating the input interface 613 such that the follower 647 cross over from the second pit 655 of the cam track 651 to the third straight section 665 of the cam track 651, the biasing force of the link-member-biasing sub-arrangement 681 may then result in the movement of the first link member 602 relative to the first handle part 110 from the extended position towards the retracted position with the cam plate 645 sliding relative the follower 647 as the follower 647 follows the third straight section 665 of the cam track 651 and the fourth straight section 667 of the cam track 651.

As shown, according to various embodiments, when the first link member 602 is in the extended position, each coil spring 683, 685 may be in tension and may be oriented to form an acute angle with respect to the extension axis 601. Accordingly, each coil spring 683, 685 may be stretched and oriented to angle towards the extension axis 601 in the direction of extension along the extension axis 601. Thus, the second end of each coil spring 683, 685 may be forward of the first end of each coil spring 683, 685 with respect to the direction of retraction along the extension axis 601.

According to various embodiments, the link-member-biasing sub-arrangement 681 may be configured to automate movement of the first link member 602 relative to the first handle part 110 from the retracted position to the extended position, or from the extended position to the retracted position, or in both directions.

According to various embodiments, in order for the link-member-biasing sub-arrangement 681 to be capable of automating movement of the first link member 602 relative to the first handle part 110 in both directions (i.e. from the retracted position to the extended position and from the extended position to the retracted position), the first end of each coil spring 683, 685 may be pivotably coupled to the first link member 602 and the second end of each coil spring 683, 685 may be pivotably coupled to the first handle part 110.

In this manner, when the first link member 602 in the retracted position is released from being restrained via the input interface 613 of the first movement control arrangement 611, each coil spring 683, 685 may contract to exert the biasing force to move the first link member 602 from the retracted position towards the extended position along the extension axis 601. Since each coil spring 683, 685 is pivotably coupled to the first link member 602 and pivotably coupled to the first handle part 110, each coil spring 683, 685 may pivot about the second end thereof with respect to the first handle part 110 and may pivot about the first end thereof with respect to the first link member 602 as the first link member 602 moves relative to the first handle part 110 (from the retracted position towards the extended position). Upon the first link member 602 reaching an equilibrium point whereby the pair of coil springs 683, 685 are fully contracted and aligned in a straight line (or in a coaxial manner) perpendicular to the extension axis 602, the first link member 602 may continue to move relative to the first handle part 110 pass the equilibrium point and towards the extended position due to an extension momentum from the sudden release of the first link member 602 from being restrained in the retracted position. With the first link member 602 continuing to move relative to the first handle part 110 pass the equilibrium point and towards the extended position due to the extension momentum, each coil spring 683, 685 may start to extend with the first end thereof stretching away from the second end in the direction of extension. According to various embodiments, the extension momentum may be sufficient to continue moving the first link member 602 towards the extended position until the first link member is restrained in the extended position. According to various embodiments, when there is insufficient momentum to move the first link member 602 relative to the first handle part 110 all the way until the first link member 602 reaches the extended position, the user may pull apart the first handle part 110 and the first link member 602 until the first link member 602 reaches the extended position and is restrained in the extended position.

Similarly, when the first link member 602 in the extended position is released from being restrained via the input interface 613 of the first movement control arrangement 611, each coil spring 683, 685 may contract to exert the biasing force to move the first link member 602 from the extended position towards the retracted position along the extension axis 601. Since each coil spring 683, 685 is pivotably coupled to the first link member 602 and pivotably coupled to the first handle part 110, each coil spring 683, 685 may pivot about the second end thereof with respect to the first handle part 110 and may pivot about the first end thereof with respect to the first link member 602 as the first link member 602 moves relative to the first handle part 110 (from the extended position towards the retracted position). Upon the first link member 602 reaching an equilibrium point whereby the pair of coil springs 683, 685 are fully contracted and aligned in a straight line (or in a coaxial manner) perpendicular to the extension axis 602, the first link member 602 may continue to move relative to the first handle part 110 pass the equilibrium point and towards the retracted position due to a retraction momentum from the sudden release of the first link member 602 from being restrained in the extended position. With the first link member 602 continuing to move relative to the first handle part 110 pass the equilibrium point and towards the retracted position due to the extension momentum, each coil spring 683, 685 may start to extend with the first end thereof stretching away from the second end in the direction of retraction. According to various embodiments, the retraction momentum may be sufficient to continue moving the first link member 602 towards the retracted position until the first link member 602 is restrained in the extended position. According to various embodiments, when there is insufficient momentum to move the first link member 602 relative to the first handle part 110 all the way until the first link member 602 reaches the retracted position, the user may pull together the first handle part 110 and the first link member 602 until the first link member 602 reaches the retracted position and is restrained in the retracted position.

Various embodiments have provided an extendable controller capable of synchronously (or simultaneously) extending or retracting the first handle part and the second handle part uniformly (or symmetrically) in opposite directions relative to the elongate bridge. Various embodiments has further provided an extendable controller capable of secondary extension via a link member for the extendable controller to be capable of being fitted to mobile phones as well as tablet. Various embodiments have also provided an extendable controller which is reliable and durable, and which is capable of providing stable and balance extension and retraction of the extendable controller.

While the invention has been particularly shown and described with reference to specific embodiments, it should be understood by those skilled in the art that various changes, modification, variation in form and detail may be made therein without departing from the scope of the invention as defined by the appended claims. The scope of the invention is thus indicated by the appended claims and all changes which come within the meaning and range of equivalency of the claims are therefore intended to be embraced.

The invention claimed is:

1. An extendable controller comprising
   a handle part;
   an elongate bridge retractably extendable with respect to the handle part along a longitudinal axis of the elongate bridge;
   a link member disposed between the handle part and the elongate bridge, wherein an end portion of the elongate bridge is in sliding engagement with the link member so as to be retractably extendable relative to the link member along the longitudinal axis of the elongate bridge, wherein the link member is movable relative to the handle part between a retracted position and an extended position along an extension axis parallel to or coincident with the longitudinal axis of the elongate bridge; and
   a movement control arrangement operatively connected between the link member and the handle part to restrain the link member from moving between the retracted position and the extended position relative to the handle part when the link member is in the retracted position and in the extended position respectively, wherein the movement control arrangement comprises an input interface operable to release the link member from being restrained, when the link member is in the retracted position and in the extended position respectively, such that the link member is movable between the retracted position and the extended position relative to the handle part.

2. The extendable controller as claimed in claim 1,
   wherein the movement control arrangement comprises a translating cam mechanism,
   wherein the translating cam mechanism comprises a cam plate fixedly disposed at the link member and a follower associated with the handle part,
   wherein the follower is non-movable relative to the handle part in a direction parallel to the extension axis of the link member relative to the handle part.

3. The extendable controller as claimed in claim 2,
wherein the cam plate comprises a cam track having a first pit at a first end of the cam track and a second pit at a second end of the cam track, the first end of the cam track and the second end of the cam track being opposite each other with respect to the extension axis of the link member,
wherein the link member is being restrained in the retracted position when the follower drops into the first pit of the cam track and the link member is being restrained in the extended position when the follower drops into the second pit of the cam track.

4. The extendable controller as claimed in claim 3,
wherein the cam track comprises a closed loop track,
wherein the closed loop track comprises four straight sections arranged in a rhombus formation,
wherein the first pit and the second pit are at two opposite corners of the rhombus formation.

5. The extendable controller as claimed in claim 4,
wherein the cam track comprises a first straight section followed by a second straight section from the first pit to the second pit,
wherein the cam track comprises a cam profile having a sharp rise at a transition between the first pit and the first straight section and a continuous gradual return along the first straight section and the second straight section towards the second pit.

6. The extendable controller as claimed in claim 5,
wherein the sharp rise at the transition between the first pit and the first straight section is in the form of a wall or a steep surface extending along a corresponding side of the first pit so as to serve as a stopper blocking the follower from crossing over from the first pit to the first straight section while the follower is in the first pit in order to restrain the link member when the link member is in the retracted position.

7. The extendable controller as claimed in claim 6,
wherein the input interface of the movement control arrangement is operable to lift the follower over the sharp rise to cross over from the first pit to the first straight section so as to release the link member from being restrained such that the link member is movable relative to the handle part with the follower following along the first straight section and the second straight section.

8. The extendable controller as claimed in claim 7,
wherein the cam profile comprises a sharp drop at a transition between the second straight section and the second pit, wherein, when the follower crosses over the sharp drop into the second pit, the sharp drop serves as a stopper blocking the follower from crossing back from the second pit to the second straight section so as to restrain the follower in the second pit in order to restrain the link member when the link member is in the extended position.

9. The extendable controller as claimed in claim 8,
wherein the closed loop track comprises a third straight section followed by a fourth straight section from the second pit to the first pit, wherein the cam profile of the closed loop track has a further sharp rise at a transition between the second pit and the third straight section and a further continuous gradual return along the third straight section and the fourth straight section towards the first pit.

10. The extendable controller as claimed in claim 9,
wherein the further sharp rise at the transition between the second pit and the third straight section is in the form of a wall or a steep surface extending along a corresponding side of the second pit so as to serve as a stopper blocking the follower from crossing over from the second pit to the third straight section while the follower is in the second pit in order to restrain the link member when the link member is in the extended position.

11. The extendable controller as claimed in claim 10,
wherein the input interface of the movement control arrangement is operable to lift the follower over the further sharp rise to cross over from the second pit to the third straight section so as to release the link member from being restrained such that the link member is movable relative to the handle part with the follower following along the third straight section and the fourth straight section.

12. The extendable controller as claimed in claim 11,
wherein the cam profile comprises a further sharp drop at a transition between the fourth straight section and the first pit, wherein, when the follower crosses over the further sharp drop into the first pit, the further sharp drop serves as a stopper blocking the follower from crossing back from the first pit to the fourth straight section so as to restrain the follower in the first pit in order to restrain the link member when the link member is in the retracted position.

13. The extendable controller as claimed in claim 3,
wherein the movement control arrangement comprises a follower-biasing-member operatively connected between the handle part and the follower to exert a biasing force on the follower so as to urge a tip of the follower to towards the cam track.

14. The extendable controller as claimed in claim 13,
wherein the input interface of the movement control arrangement comprises a pusher disposed to engage the follower in a manner such that the input interface is operable to drive the pusher to apply a force on the follower to counteract the biasing force of the follower-biasing-member so as to lift the tip of the follower away from the cam track.

15. The extendable controller as claimed in claim 13,
wherein the follower-biasing-member comprises a leaf spring or a torsion spring coupled to the handle part and with a leg of the leaf spring or the torsion spring in engagement with the follower to exert the biasing force on the follower.

16. The extendable controller as claimed in claim 1,
further comprising a motion-assistance arrangement operatively connected between the link member and the handle part to actuate the link member so as to automate movement of the link member relative to the handle part between the retracted position and the extended position when the input interface is operated to release the link member from being restrained.

17. The extendable controller as claimed in claim 16,
wherein the motion-assistance arrangement comprises a link-member-biasing sub-arrangement connected between the handle part and the link member,
wherein, when the link member is in the retracted position, the link-member-biasing sub-arrangement applies a biasing force to urge the link member to move relative to the handle part from the retracted position towards the extended position.

18. The extendable controller as claimed in claim 17,
wherein, when the link member is in the extended position, the link-member-biasing sub-arrangement applies a biasing force to urge the link member to move relative to the handle part from the extended position towards the retracted position.

19. The extendable controller as claimed in claim 18,
wherein the link-member-biasing sub-arrangement comprises a pair of coil springs disposed on opposite sides of the link member across the extension axis, wherein a first end of each coil spring is pivotably coupled to the link member and a second end of each coil spring is pivotably coupled to the handle part,
wherein, when the link member is in the retracted position, each coil spring is in tension and is oriented to form an acute angle with respect to the extension axis, whereby the second end of each coil spring is forward of the first end of each coil spring with respect to a direction of extension along the extension axis,
wherein, when the link member in the retracted position is released from being restrained via the input interface, each coil spring contracts to exert the biasing force to move the link member from the retracted position towards the extended position along the extension axis, pivots about the second end thereof with respect to the handle part, and extends with the first end thereof stretching away from the second end in the direction of extension as an extension momentum continues to move the link member towards the extended position until the link member is restrained in the extended position,
wherein, when the link member is in the extended position, each coil spring is in tension and is oriented to form an acute angle with respect to the extension axis, whereby the second end of each coil spring is forward of the first end of each coil spring with respect to a direction of retraction along the extension axis, the direction of retraction and the direction of extension being opposite directions along the extension axis,
wherein, when the link member in the extended position is released from being restrained via the input interface, each coil spring contracts to exert the biasing force to move the link member from the extended position towards the retracted position along the extension axis, pivots about the second end thereof with respect to the handle part, and extends with the first end thereof stretching away from the second end in the direction of retraction as a retraction momentum continues to move the link member towards the retracted position until the link member is restrained in the retracted position.

20. The extendable controller as claimed in claim 17,
wherein the link-member-biasing sub-arrangement comprises a pair of coil springs disposed on opposite sides of the link member across the extension axis, wherein a first end of each coil spring is coupled to the link member and a second end of each coil spring is coupled to the handle part,
wherein, when the link member is in the retracted position, each coil spring is in tension and is oriented to form an acute angle with respect to the extension axis, whereby the second end of each coil spring is forward of the first end of each coil spring with respect to a direction of extension along the extension axis.

* * * * *